US012812737B2

(12) United States Patent
Hilgers et al.

(10) Patent No.: US 12,812,737 B2
(45) Date of Patent: Nov. 24, 2026

(54) INDUCTION HEATER FOR CALENDER ROLLER

(71) Applicant: Tesla, Inc., Austin, TX (US)

(72) Inventors: Andy Hilgers, Los Angeles, CA (US); Engelbert Diec, El Monte, CA (US); Bonne Eggleston, Palo Alto, CA (US); Matthew Thomas Matsumoto, Oakland, CA (US); Fahem Yahiaoui, Oakland, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 18/786,226

(22) Filed: Jul. 26, 2024

(65) Prior Publication Data

US 2025/0040000 A1 Jan. 30, 2025

Related U.S. Application Data

(60) Provisional application No. 63/516,322, filed on Jul. 28, 2023.

(51) Int. Cl.
*H05B 6/14* (2006.01)
*B05C 11/00* (2006.01)
(Continued)

(52) U.S. Cl.
CPC .............. *H05B 6/145* (2013.01); *B05C 11/00* (2013.01); *B05C 11/025* (2013.01)

(58) Field of Classification Search
CPC .. A45D 2044/007; A61B 5/0075; A61B 5/44; A61B 5/441; A61B 5/443; A61B 5/448;
(Continued)

(56) References Cited

U.S. PATENT DOCUMENTS 5,526,103 A 6/1996 Kato et al.
6,483,088 B2 11/2002 Uehara et al.
(Continued)

FOREIGN PATENT DOCUMENTS

DE 19532044 3/1996
DE 19830034 12/1999
(Continued)

OTHER PUBLICATIONS

Translation of DE000019830034, "Method For Hot Rolling Metal Especially Steel Strips", Dec. 30, 1999, By WIPO (Year: 1999).*
(Continued)

*Primary Examiner* — Quang T Van
(74) *Attorney, Agent, or Firm* — Schwegman Lundberg & Woessner, P.A.

(57) ABSTRACT

An induction heater system for manufacturing an electrode for various energy storage devices may include a power generator configured to generate power. The system may also include induction heating coils disposed adjacent to ends of at least one of a first roller or a second roller and configured to generate an electromagnetic field based on the power. The system may further include a heater plate surrounding the ends of at least one of the first or second rollers and configured to receive the electromagnetic field and generate an eddy current that generates heat on the heater plate based on electromagnetic field induction such that the generated heat is transferred to the one or both ends of at least one of the first roller or the second roller via thermal conduction.

10 Claims, 18 Drawing Sheets

(51) Int. Cl.

| | |
|---|---|
| ***B05C 11/02*** | (2006.01) |
| ***G03G 15/20*** | (2006.01) |
| ***H05B 6/06*** | (2006.01) |

(58) Field of Classification Search

CPC ....... B05C 11/00; B05C 11/025; B30B 15/34; B30B 3/04; G01N 21/33; G01N 21/35; G01N 2201/06113; G01N 2201/062; G06Q 10/06316; G06Q 30/06; G06Q 30/0623; G06Q 30/0631; G06Q 30/0633; G16H 20/10; G16H 40/63; G16H 70/20; H01M 4/0435; H05B 6/105; H05B 6/145

USPC .................................................. 219/219, 216

See application file for complete search history.

(56) References Cited

U.S. PATENT DOCUMENTS

| | | | | |
|---|---|---|---|---|
| 6,643,491 | B2 | 11/2003 | Kinouchi et al. | |
| 6,810,230 | B2 | 10/2004 | Imai et al. | |
| 6,818,871 | B2 | 11/2004 | Ogasawara et al. | |
| 6,847,019 | B2 | 1/2005 | Yokozeki et al. | |
| 6,901,235 | B2 | 5/2005 | Shimizu et al. | |
| 6,933,479 | B2 | 8/2005 | Tanaka et al. | |
| 7,122,768 | B2 | 10/2006 | Imai et al. | |
| 7,129,448 | B2 | 10/2006 | Matsunaga et al. | |
| 7,194,234 | B2 | 3/2007 | Katakabe et al. | |
| 7,480,478 | B2 | 1/2009 | Aze et al. | |
| 7,868,272 | B2 | 1/2011 | Yokota et al. | |
| 10,999,900 | B2 | 5/2021 | Kitano et al. | |
| 2004/0265021 | A1* | 12/2004 | Kinouchi ........... | G03G 15/2042 399/334 |
| 2005/0173415 | A1 | 8/2005 | Yamamoto et al. | |
| 2005/0201768 | A1* | 9/2005 | Tatematsu ............ | G03G 15/205 399/69 |
| 2011/0135333 | A1* | 6/2011 | Ohno .................. | B65H 29/125 399/69 |
| 2023/0129474 | A1 | 4/2023 | Frasnetti et al. | |

FOREIGN PATENT DOCUMENTS

| | | |
|---|---|---|
| DE | 19921546 | 11/2000 |
| DE | 10209544 | 5/2006 |
| EP | 0159337 | 2/1996 |
| IN | 202114020883 | 12/2021 |
| WO | 2025029638 | 2/2025 |

OTHER PUBLICATIONS

"International Application Serial No. PCT US2024 039778, International Search Report mailed Nov. 22, 2024", 4 pgs.

"International Application Serial No. PCT US2024 039778, Written Opinion mailed Nov. 22, 2024", 9 pgs.

"International Application Serial No. PCT US2024 039778, International Preliminary Report on Patentability mailed Feb. 12, 2026", 11 pgs.

"Mexican Application Serial No. MX a 2026 001072, Office Action mailed Feb. 6, 2026", w o English Translation, 4 pgs.

"Canadian Application Serial No. 3,299,890, Voluntary Amendment filed Jan. 28, 2026", 14 pgs.

"Mexican Application Serial No. MX a 2026 001072, Response filed Apr. 17, 2026 to Office Action mailed Feb. 6, 2026", W English machine translation, 152 pgs.

* cited by examiner

1204

INDUCTION HEATER FOR CALENDER ROLLER

CLAIM FOR PRIORITY

This application claims the benefit of priority of U.S. Application Ser. No. 63/516,322, filed Jul. 28, 2023, which is hereby incorporated by reference in its entirety.

BACKGROUND

Energy storage devices, such as batteries and capacitors, are integral to a wide range of applications, from consumer electronics to electric vehicles and renewable energy systems. The performance and efficiency of these devices are heavily influenced by the quality and uniformity of their electrodes. Manufacturing processes for these electrodes often involve the use of rollers to form thin material layers on substrates. These processes seek to ensure consistent material properties and dimensions to achieve reliable and efficient energy storage. Variations in the manufacturing process can lead to inconsistencies in the electrode's thickness and properties, which can affect the overall performance of the energy storage device.

TECHNICAL FIELD

The present disclosure relates to an induction heater for manufacturing an electrode for various energy storage devices.

DESCRIPTION OF RELATED TECHNOLOGY

Calender or lamination rollers can be used to form a film or a material layer on a base substrate by rolling a material therebetween. The base substate with the film or material layer formed can be used for various purposes, for example, energy storage cell electrodes.

BRIEF DESCRIPTION OF THE DRAWINGS

The foregoing and other features of the disclosure will become more fully apparent from the following description and appended claims, taken in conjunction with the accompanying drawings. Understanding that these drawings depict several examples in accordance with the disclosure and are not to be considered limiting of its scope, the disclosure will be described with additional specificity and detail through use of the accompanying drawings.

Figure 1A:
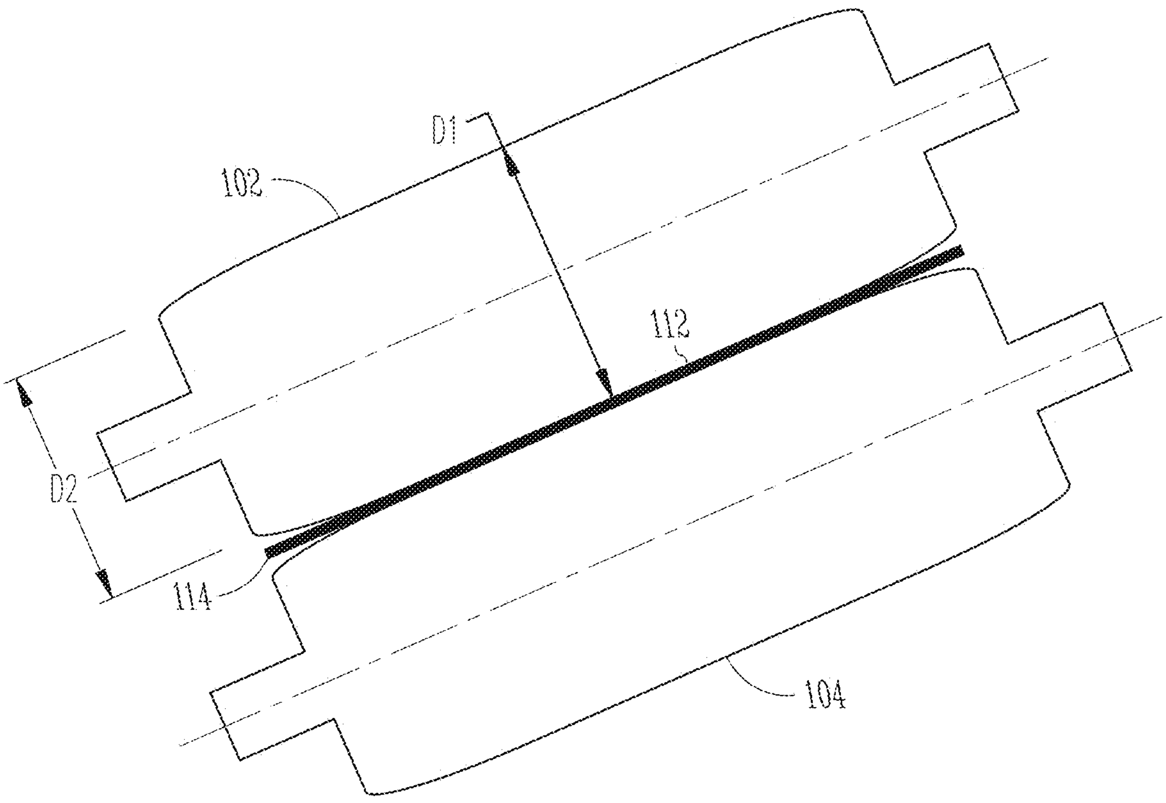
FIG. 1A and FIG. 1B show thermal crowning on lamination or calender rollers results in thicker film thickness on the ends of the rollers.

Examples of the present disclosure and their advantages are best understood by referring to the detailed description that follows. It should be appreciated that like reference numerals are used to identify like elements illustrated in one or more of the figures, wherein showings therein are for purposes of illustrating examples of the present disclosure and not for purposes of limiting the same.

DETAILED DESCRIPTION

Provided herein are various examples of an induction heater for manufacturing an electrode having a substantially even or uniform thickness for various energy storage devices. Some examples include an induction heater configured to heat end portions of an electrode manufacturing roller (e.g., a calender or lamination roller) so that the diameter of the roller can be substantially uniform across the length of the roller or to otherwise modify at least a diameter of the roller. Some examples include a fixed induction heater mounted to a bearing block facing (but not contacting) the end of a rotating roller that generates an electromagnetic field that creates eddy currents that can heat up the end of the roller to compensate for inherent heat loss. This can be performed in a contactless heating process, avoiding electrical slip rings, for example, in a confined space between the bearing block and the end of the roller.

Examples may be deployed to address thermal crowning in calender rollers. Thermal crowning in calender rollers is a phenomenon where the diameter of the roller increases at the center due to temperature variations. This occurs because different parts of the roller experience varying temperatures during operation, leading to uneven thermal expansion. The central region of the roller may heat up more than the edges, for example, due to friction between the roller and the material being processed. This differential expansion results in a slight bulging or "crowning" effect in the center of the roller.

The uneven thermal expansion may be influenced by the material properties of the roller, such as its thermal conductivity. Metals, commonly used for rollers, have varying rates of heat conduction, which can exacerbate the crowning effect. For instance, the radial heat flow in a steel roll is relatively slow, causing the temperature to rise more in the center than at the edges. This phenomenon is further complicated by operational conditions, such as the speed of the roller and the load applied, which can generate more heat due to friction, leading to more pronounced thermal gradients and, thus, more significant crowning.

Journal bearings at the ends of the rollers can also act as heat sinks, influencing the temperature distribution along the roller. These bearings support the shaft with a thin layer of oil, preventing metal-to-metal contact and providing damping properties. The lubricant in journal bearings not only reduces friction but also removes heat from the bearing surfaces, effectively acting as a partial heat sink. This cooling effect at the ends of the rollers can create a temperature gradient, where the ends are cooler than the center, contributing to the thermal crowning effect.

The increase in diameter at the center of the roller can pose several problems. One such issue is the uneven pressure distribution across the roller's surface. Uneven pressure can lead to defects such as wrinkles, fold overs, and inconsistent thickness in the processed material, compromising product quality. Additionally, if thermal crowning is not adequately managed, it can cause excessive wear and tear on the roller, reducing its operational lifespan and increasing maintenance costs.

To manage and control the temperature and, consequently, the thermal crowning of calender rollers, oil circuits in heaters can be employed. These systems circulate thermal oil through the rollers, maintaining a consistent temperature across the roller's surface. The thermal oil, heated in a boiler, is pumped through the roller's internal channels, seeking to even heat distribution. While this helps mitigate the temperature gradients that cause thermal crowning, it may be insufficient to maintain uniform thermal expansion and maintain a desired roller profile.

Some examples discussed herein include a fixed induction heater, including one or more induction coils, mounted to a static or fixed component, such as a bearing block facing (but not contacting) the end of a rotating roller (e.g., a steel or other ferrous material roller). The induction heater generates an electromagnetic field that creates eddy currents that can heat up the end of the roller to compensate for inherent heat loss, as discussed above. This can be performed in a contactless heating process, avoiding electrical slip rings, for example, in a confined space between the bearing block and the end of the roller. This heating process seeks to maintain a uniform temperature distribution along the length of the roller, thereby preventing thermal crowning and ensuring a consistent diameter. The uniform diameter may help achieve an even material layer on the substrate, which improves the quality and efficiency of the electrodes or other products being manufactured.

Some examples include a heater plate or a ring assembly fixed to a roller end. The heater plate may include a lamination of two ring plates (e.g., flat donuts or round washers) stacked on the end of the roller. The ring plate closest to the induction heating coil can be made from steel or other ferrous materials to better promote eddy current generation for greater heating efficiency. The adjacent copper plate may act as a heat transfer plate to efficiently conduct the heat. Although copper is used as an example, other materials may be used with relatively high thermal conductivity as compared to steel/ferrous materials.

The copper plate may be in direct or indirect thermal contact with the end of the steel roller and is designed with recessed areas to avoid transferring heat into the roller's internal oil heating lines. These oil heating lines are part of a circuit within the roller that circulates heated oil (or other fluid) to distribute heat along its length, as discussed above. Adding induction heating to the ends of a heated roller can be advantageous over other heated rollers, such as electrically heated rollers, as the former can transfer more heat, be significantly simpler in structure and operation, and thus less expensive and more reliable than the latter.

For purposes of summarizing the described technology and the advantages achieved over the conventional technology, certain objects and advantages of the described technology are described herein. Not all such objects or advantages may be achieved in any particular example of the described technology. Thus, for example, those skilled in the art will recognize that the described technology may be embodied or carried out in a manner that achieves or optimizes one advantage or group of advantages as taught herein without necessarily achieving other objects or advantages as may be taught or suggested herein.

Figure 1B:
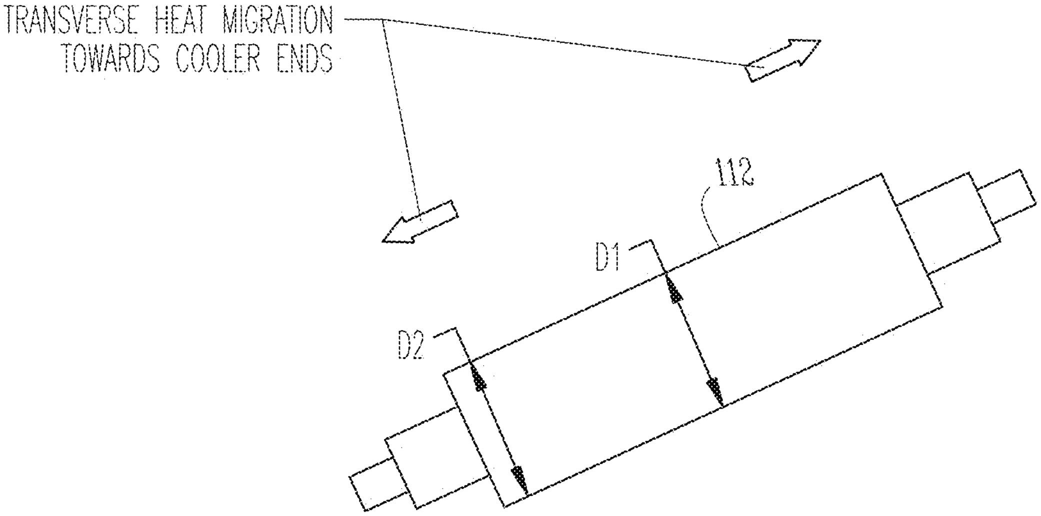
Figure 2:
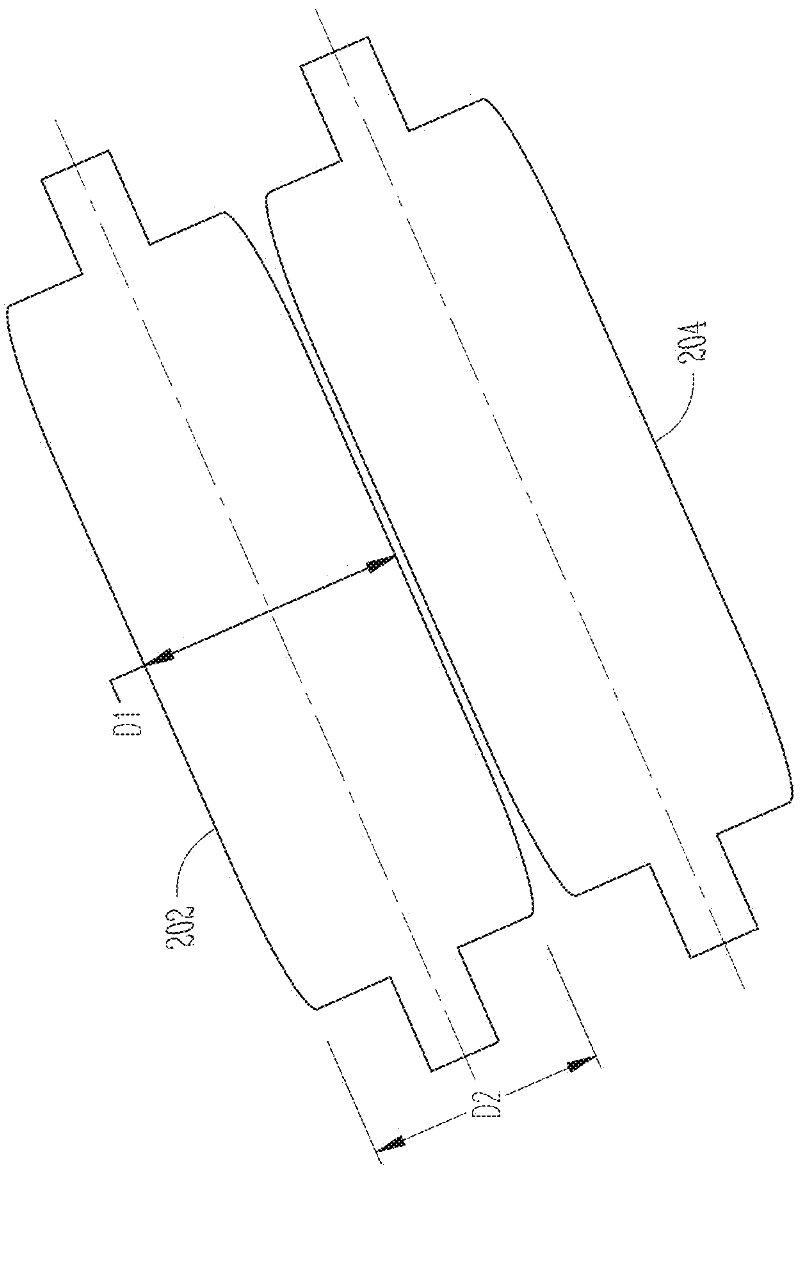
FIG. 2 is a magnified view of the rollers of FIG. 1A.

FIG. 1A and FIG. 1B show that thermal crowning on lamination or calender rollers 102 and 104 can result in thicker film thicknesses on the ends of the rollers 102 and 104. FIG. 2 is a magnified view of the rollers of FIG. 1A. Journal bearings 110 in the rollers 102 and 104 may be water cooled so that longitudinal heat migration may occur towards cooler ends of the rollers 102 and 104. Due to reduced thermal expansion with heat lost to the journal bearings journal bearing 110 the diameter (D1) of a middle portion 112 of each of the rollers 102 and 104 can be larger than the diameter (D2) of an end portion of each roller. The end portion of each roller having the reduced diameter (D2) can result in a thicker film formation 114 on an electrode as the end portion of the roller would press the electrode less than in the center portion of the roller. This can cause potential yield issues and reduced electrode cell efficiency. The industry term for this phenomenon is thermal roll crowning or "thermal crowning." For example, oil-heated rollers are predominantly used in calender rollers. The full roller length may not be fully utilized due to thermal crowning on the ends and doing so results in larger film thickness measured on the outer lanes. Depending on process temperatures, up to about 25% of production yield can be lost. This is an industry-wide problem because rollers routinely have a journal bearing 110 that acts as a heat sink (e.g., because it is water-cooled and/or otherwise designed to dissipate heat).

To provide further context, thermal crowning in calender rollers is, as noted above, a phenomenon where the diameter of the roller increases at the center due to temperature variations. This occurs because different parts of the roller experience varying temperatures during operation, leading to uneven thermal expansion. The central region of the roller may heat up more than the edges, for example, due to friction between the roller and the material being processed. This differential expansion results in a slight bulging or "crowning" effect in the center of the roller.

The uneven thermal expansion may be influenced by the material properties of the roller, such as its thermal conductivity. Metals, commonly used for rollers, have varying rates of heat conduction, which can exacerbate the crowning effect. For instance, the radial heat flow in a steel roll is relatively slow, causing the temperature to rise more in the center than at the edges. This phenomenon is further complicated by operational conditions, such as the speed of the roller and the load applied, which can generate more heat due to friction, leading to more pronounced thermal gradients and, thus, more significant crowning.

Journal bearings at the ends of the rollers can also act as heat sinks, influencing the temperature distribution along the roller. These bearings support the shaft with a thin layer of oil, preventing metal-to-metal contact and providing damping properties. The lubricant in journal bearings not only reduces friction but also removes heat from the bearing surfaces, effectively acting as a partial heat sink. This cooling effect at the ends of the rollers can create a temperature gradient, where the ends are cooler than the center, contributing to the thermal crowning effect.

The increase in diameter at the center of the roller can pose several problems, which can impact production yield. One such issue is the uneven pressure distribution across the roller's surface. Uneven pressure can lead to defects such as wrinkles, fold overs, and inconsistent thickness in the processed material, compromising product quality. Additionally, if thermal crowning is not adequately managed, it can cause excessive wear and tear on the roller, reducing its operational lifespan and increasing maintenance costs.

To manage and control the temperature and, consequently, the thermal crowning of calender rollers, as noted above, oil circuits in heaters can be employed. These systems circulate thermal oil through the rollers, maintaining a consistent temperature across the roller's surface. The thermal oil, heated in a boiler, is pumped through the roller's internal channels, seeking to even heat distribution. While this helps mitigate the temperature gradients that cause thermal crowning, it may be insufficient to maintain uniform thermal expansion and maintain a desired roller profile.

Some examples discussed herein include a fixed induction heater, including one or more induction coils, mounted to a static or fixed component, such as a bearing block facing (but not contacting) the end of a rotating roller (e.g., a steel or other ferrous material roller). The induction heater generates an electromagnetic field that creates eddy currents that can heat up the end of the roller to compensate for inherent heat loss, as discussed above. This can be performed in a contactless heating process, avoiding electrical slip rings, for example, in a confined space between the bearing block and the end of the roller. This heating process seeks to maintain a uniform temperature distribution along the length of the roller, thereby preventing thermal crowning and ensuring a consistent diameter. The uniform diameter may help achieve an even material layer on the substrate, which improves the quality and efficiency of the electrodes or other products being manufactured.

Some examples include a heater plate or a ring assembly fixed to a roller end. The heater plate may include a lamination of two ring plates (e.g., flat donuts or round washers) stacked on the end of the roller. The ring plate closest to the induction heating coil can be made from steel or other ferrous materials to better promote eddy current generation for greater heating efficiency. The adjacent copper plate may act as a heat transfer plate to efficiently conduct the heat. Although copper is used as an example, other materials may be used with relatively high thermal conductivity as compared to steel/ferrous materials.

The copper plate may be in direct or indirect thermal contact with the end of the steel roller and is designed with recessed areas to avoid transferring heat into the roller's internal oil heating lines. These oil heating lines are part of a circuit within the roller that circulates heated oil (or other fluid) to distribute heat along its length, as discussed above. Adding induction heating to the ends of a heated roller can be advantageous over other heated rollers, such as electrically heated rollers, as the former can transfer more heat, be significantly simpler in structure and operation, and thus less expensive and more reliable than the latter.

For purposes of summarizing the described technology and the advantages achieved over the conventional technology, certain objects and advantages of the described technology are described herein. Not all such objects or advantages may be achieved in any particular example of the described technology. Thus, for example, those skilled in the art will recognize that the described technology may be embodied or carried out in a manner that achieves or optimizes one advantage or group of advantages as taught herein without necessarily achieving other objects or advantages as may be taught or suggested herein.

Figure 3:
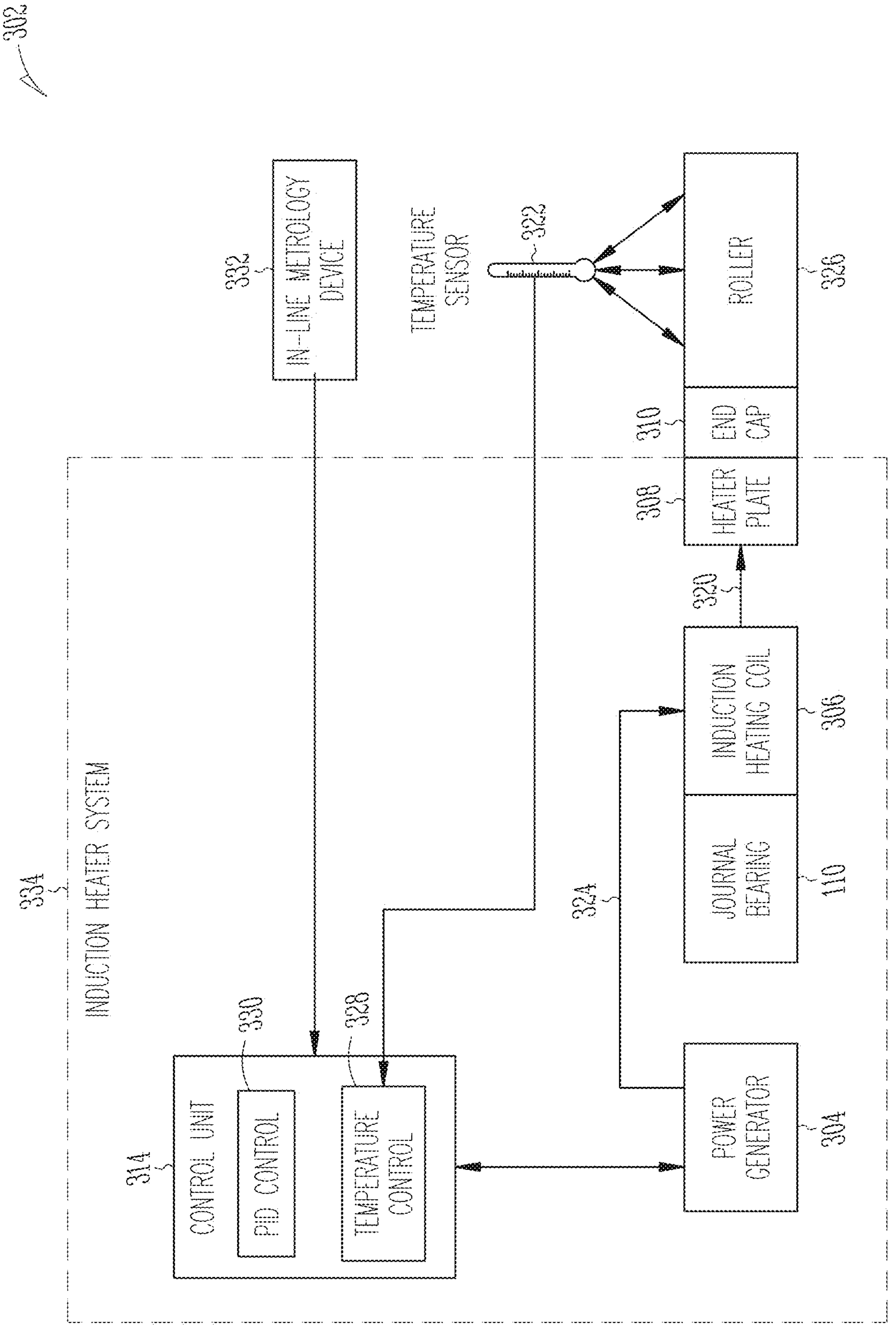
FIG. 3 shows an example induction heating system according to some examples.

FIG. 3 is a schematic diagram showing a side view of a roller system 302, according to some examples.

The roller system 302 includes rollers 326 proximal to an opposing member, such as a further roller (not shown). The rollers 326 are configured to press a material layer on a substrate interposed therebetween. The rollers 326 are composed of multiple steel alloys and may be either cast or forged steel.

In some examples, the rollers 326 may have a complex internal structure to accommodate a closed-loop hot oil system. This system connects to a rotary union on the end of the roller, with channels within the roller distributing the hot oil for heat transfer. The use of multiple steel alloys in the roller construction may provide enhanced thermal properties and mechanical strength.

The composition and manufacturing method of the rollers 326 (e.g., cast or forged steel) may influence their thermal characteristics and response to the induction heating system. The multiple steel alloys used in the roller construction may be selected to balance factors such as thermal conductivity, heat capacity, and resistance to thermal expansion.

The outer surface of the rollers 326, which comes into contact with the material layer and substrate, may be made of a specific steel alloy chosen for its wear resistance and surface finish properties. This outer layer may interface with a heater plate 308, particularly a second ring 404, which is responsible for transferring heat to the roller.

The roller system 302 includes a journal bearing 110 that supports journals 316 of the rollers 326. The journal bearing 110 may act as a heat sink, influencing the temperature distribution along the rollers 326. The journal bearing 110 may incorporate additional features to manage heat distribution. For instance, it may include internal cooling channels through which a coolant (e.g., water) circulates. This cooling system may help to regulate the temperature at the roller ends, working in conjunction with the induction heating system to achieve optimal temperature distribution.

The roller system 302 comprises a power generator 304 configured to generate power. The power generator 304 may be connected to the roller system 302 wirelessly or by wire. The power generator 304 may be controlled by a control unit 314.

The roller system 302 includes one or more induction heating coils 306 disposed adjacent to one or both ends of the rollers 326. The induction heating coils 306 are configured to generate a magnetic field 320 based on the power supplied by the power generator 304. In some examples, the induction heating coils 306 may be fixed while the rollers 326 rotate. For example, the induction heating coil 306 may be secured or mounted to the journal bearing 110 or other stationary component of the roller system 302.

The heater plate 308 is thermally coupled to an end cap 310 of the rollers 326. The heater plate 308 is configured to receive the magnetic field 320 from the induction heating coils 306 and generate an eddy current in response. The eddy current generates heat on the heater plate 308 based on electromagnetic field induction. The generated heat is then transferred to the end portion of the rollers 326 via thermal conduction.

In some examples, the heater plate 308 may comprise a first ring 402 made of a ferromagnetic material (e.g., steel) to generate the eddy current and heat, and a second ring 404 made of a thermally conductive material (e.g., copper) to transfer the heat from the first ring 402 to the rollers 326.

The roller system 302 incorporates a control unit 314 coupled to the power generator 304. The control unit 314 operationally controls the heating of the rollers 326. The control unit 314 includes a temperature control 328 that may use input from one or more temperature sensors 322 that measure temperature along the rollers to dynamically adjust the heating.

An in-line metrology device 332 may be included to measure at least one of the thicknesses or loading densities of the material layer formed by the rollers 326. The control unit 314 may implement a closed-loop Proportional-Integral-Derivative (PID) control 330 based on feedback from the temperature sensors 322 and the in-line metrology device 332 to control the power generator 304.

By way of further detail, in some examples, the induction heating coils 306 may be split into two parts to accommodate the journals 316 of the rollers 326. This configuration allows for easier installation and maintenance of the system.

The power generator 304 may be capable of generating various types of power, including Alternating Current power (e.g., AC power 324) that is transmitted to the induction heating coil 306. The induction heating coil 306, in turn, generates Radio Frequency power (RF power) in the form of a magnetic field 320. The frequency of the RF power may be optimized for the specific materials and dimensions of the heater plate 308 and rollers 326 to maximize heating efficiency.

Induction Heating Coils 306:

The induction heating coils 306 may be designed with specific geometries to optimize the magnetic field 320 distribution. In some examples, the coils may be shaped to encompass approximately one quadrant of the circumference of the bearing block facing the roller end. This configuration may allow for efficient heating while minimizing interference with other components of the roller system 302.

The design of the induction heating coils 306 may incorporate various advanced geometries to further enhance the magnetic field 320 distribution and heating efficiency. For instance, the coils may use a helical or spiral configuration, with the number of turns and pitch calculated to produce a uniform magnetic field along the length of the heater plate 308. This helical design may help to ensure even heating across the entire surface of the heater plate.

In some examples, the induction heating coils 306 may be constructed using Litz wire, which consists of multiple strands of insulated wire twisted or woven together. The use of Litz wire can help reduce skin effect and proximity effect losses at high frequencies, improving the overall efficiency of the induction heating system.

The induction heating coil 306 may also incorporate flux concentrators made of ferrite or other high-permeability materials. These concentrators can be strategically placed around the coils to focus and intensify the magnetic field 320 in specific areas of the heater plate 308, allowing for more precise control over the heating pattern.

To accommodate the journal 316 of the rollers 326, the induction heating coils 306 may be designed in a split configuration. This may involve two semi-circular coil segments that can be installed around the roller journal 316 without requiring the disassembly of the entire roller system. The split design may also facilitate maintenance and replacement of the coils when necessary.

In some examples, the induction heating coils 306 may incorporate active cooling systems to maintain their efficiency during prolonged operation. This could involve internal channels for liquid cooling or forced air cooling, ensuring that the coils remain at an optimal operating temperature even when generating high-intensity magnetic fields.

The positioning of the induction heating coils 306 relative to the heater plate 308 may be adjustable to allow for fine-tuning of the heating profile. This adjustability may be achieved through a mounting system that allows for small changes in the distance and angle between the coils and the heater plate, providing an additional means of optimizing the heating process for different roller configurations or operating conditions.

Heater Plate 308:

The first ring 402, for example, made of steel or another ferromagnetic material, is designed to generate eddy currents when exposed to the magnetic field 320 produced by the induction heating coils 306. The ferromagnetic properties of the steel allow it to respond strongly to the alternating magnetic field, resulting in the generation of localized electric currents within the material. These eddy currents produce heat through resistive losses, effectively converting the electromagnetic energy into thermal energy.

The second ring 404, for example made of copper or another highly thermally conductive material, serves as an efficient heat transfer medium. Copper's high thermal conductivity (approximately 400 W/m·K) allows it to effectively distribute the heat generated in the first ring 402 to the rollers 326. This two-ring design helps to separate the heat generation and heat transfer functions, potentially allowing for more precise control over the heating process.

The dimensions and geometry of both rings may be designed to optimize their respective functions. For example, the first ring 402 may have an outer diameter of about 693 mm and an inner diameter of about 490 mm, while the second ring 404 may have the same outer diameter but a smaller inner diameter of about 350 mm. This configuration allows the second ring 404 to have a larger surface area in contact with the roller 326, facilitating more efficient heat transfer.

In some examples, one or each of the first ring 402 and the second ring 404 may be split into halves to facilitate installation and maintenance. The two halves of each ring can be assembled offline and then mounted to the roller ends using existing mounting points, such as M16 holes typically used for roller end caps. This split-ring design allows for convenient retrofitting of existing roller systems without requiring complete disassembly.

The interface between the first ring 402 and the second ring 404 is designed to ensure efficient heat transfer. Thermal paste or other high-conductivity materials may be applied between the rings to minimize thermal resistance at the interface. Additionally, the rings may be mechanically coupled using flat-head screws or other fasteners that maintain good thermal contact while allowing for thermal expansion.

This dual-ring configuration of the heater plate 308 allows for targeted heating of the roller ends, helping to compensate for the heat loss typically experienced at these locations due to the cooling effect of the journal bearings 110, for example.

The heater plate 308 may include additional features to enhance its performance. For instance, the second ring 404 may include oil by-pass pockets 702 that align with hot oil paths in the rollers 326. These oil by-pass pockets 702 are designed to minimize heat transfer to the hot oil system while directing heat towards the core or center of the rollers. This configuration may help to maintain a more uniform temperature distribution along the length of the rollers.

Temperature Sensor 322:

The temperature sensors 322 may use various technologies for temperature measurement. In some examples, non-contact infrared (IR) sensors may be employed to monitor the surface temperature of the heater plate 308 or the rollers 326. These sensors may provide real-time temperature data without the need for physical contact, reducing wear and maintenance requirements.

While non-contact IR sensors are discussed, the roller system 302 may also accommodate other temperature measurement technologies. For example, in some applications, contact sensors or embedded sensors within the roller 326 might be used.

In-Line Metrology Device 332

The in-line metrology device 332 may incorporate multiple measurement technologies to assess the quality of the material layer formed by the rollers 326. These may include laser thickness gauges, beta or gamma-ray thickness sensors, X-ray fluorescence analyzers, optical sensors, or capacitive/inductive sensors integrated into the production line. The combination of these technologies may allow for comprehensive monitoring of material properties.

Control Unit 314:

As noted above, the control unit 314 includes a temperature control 328 that may use input from one or more temperature sensors 322 that measure temperature along the rollers to dynamically adjust the heating.

The temperature control 328 within the control unit 314 may implement algorithms to manage the heating process based on real-time temperature data from the temperature sensors 322. These sensors may be strategically placed along the length of the rollers 326 to provide a comprehensive temperature profile.

The dynamic adjustment of heating may involve modulating the power output from the power generator 304 to the induction heating coils 306. This modulation can be achieved through techniques such as pulse-width modulation (PWM) or frequency adjustment of the AC power 324 supplied to the coils.

The control unit 314 may implement predictive algorithms that anticipate temperature changes based on historical data and current operating conditions. This predictive capability may allow the system to proactively adjust heating parameters to maintain optimal temperature distribution along the rollers 326.

Furthermore, the temperature control 328 may work in conjunction with the PID control 330 and input from the in-line metrology device 332 to create a multi-variable control system. This integrated approach allows the system to consider not only temperature but also material thickness or density when adjusting the heating parameters, potentially leading to more precise control over the final product quality.

The system may also incorporate adaptive control mechanisms that can adjust control parameters in real-time based on changing process conditions or variations in roller characteristics over time. This adaptability can help maintain optimal performance even as system components age or operating conditions change.

In some examples, an induction heater system 334, including for example the induction heating coil 306, the heater plate 308, the power generator 304 and the control unit 314, may be designed as a retrofit kit for existing roller systems. This may include split-ring configurations for the heater plate 308 and modular designs for the induction heating coils 306, allowing for easy installation on a wide range of roller sizes and configurations. The retrofit design may enable manufacturers to upgrade existing equipment to address thermal crowning issues without the need for complete system replacement.

Figure 4:
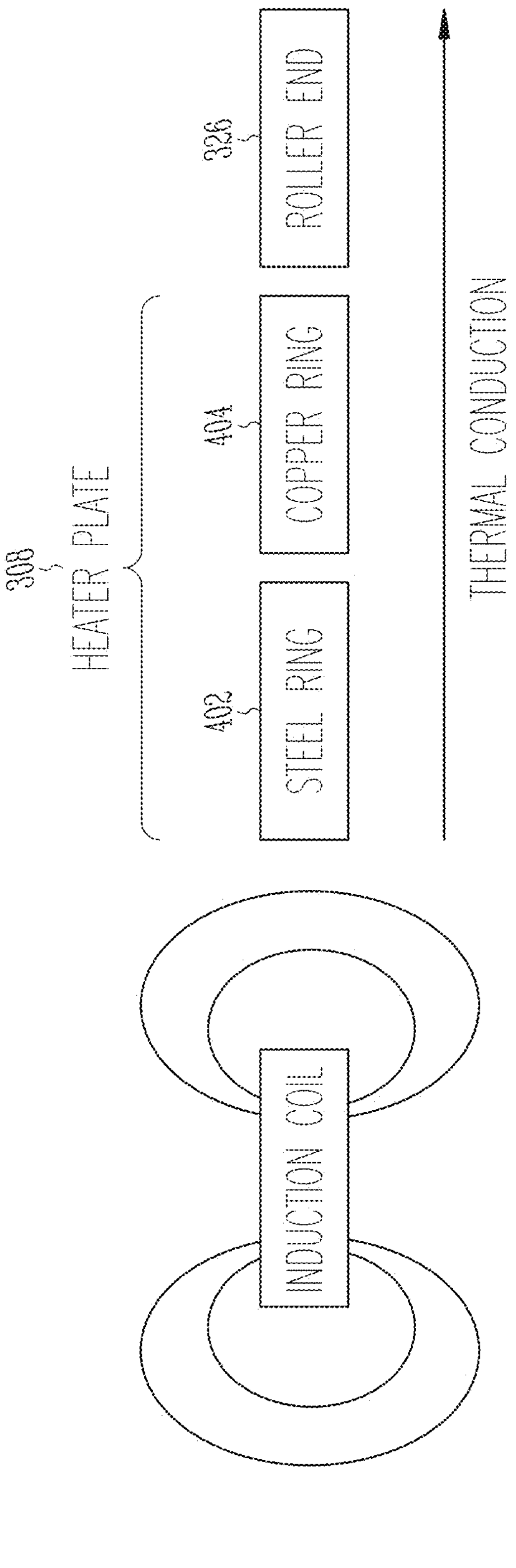
FIG. 4 is a conceptual diagram showing inductive heating according to some examples.

FIG. 4 is a conceptual diagram showing how inductive heating is performed according to some examples. The induction heating coil 306 may generate an electromagnetic field based on supplied power (e.g., AC power 324). The electromagnetic field can create eddy currents in the steel first ring 402 that can generate heat therein. The generated heat can be transferred from the steel first ring 402 to the copper second ring 404, and then from the copper second ring 404 to the roller end cap 310, via thermal conduction.

Figure 5A:
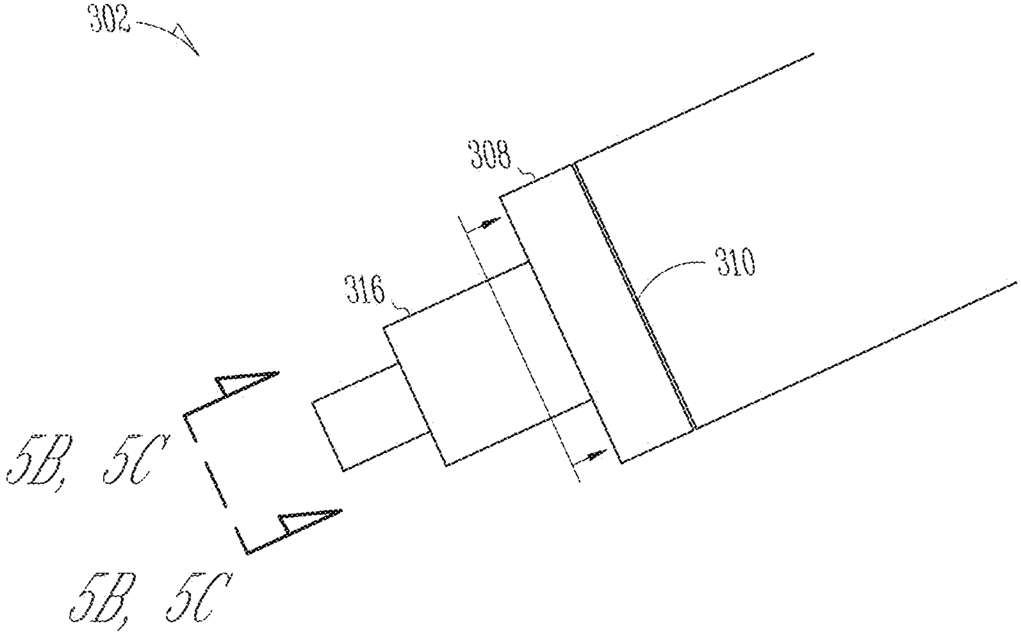
FIG. 5A illustrates how an induction heating coil (surrounding a heater plate) is installed into an end cap in one side of the roller according to some examples.

FIG. 5A illustrates how an induction heating coil 306 (surrounding a heater plate 308) can be mounted on a journal bearing 110 on one side of a roller system 302, according to some examples. The induction heating coil 306 is positioned adjacent to the heater plate 308, which is mounted on the end cap 310 of the roller system 302. The induction heating coil 306 generates an electromagnetic field that induces eddy currents in the heater plate 308, thereby generating heat. This heat is then transferred to the roller end to compensate for heat loss and maintain a uniform temperature distribution along the roller's length.

Figure 5B:
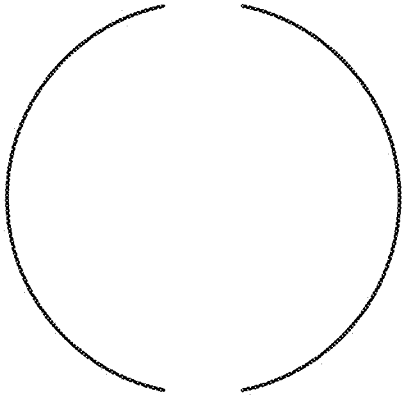
FIG. 5B and FIG. 5C illustrate example configurations of the induction heating coil according to some examples.
Figure 5C:
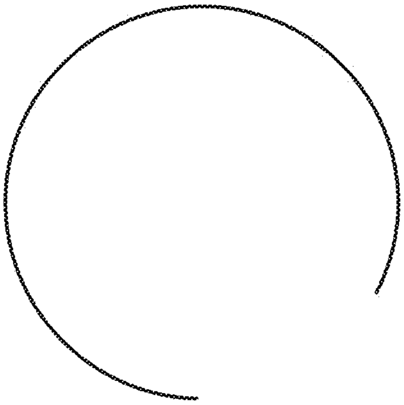

FIG. 5B and FIG. 5C illustrate example configurations of the induction heating coils 306 according to some examples. FIG. 5B and FIG. 5C show simplified views of heating coil configurations seen from view A (see FIG. 5A). The heating coil arrangement may be split into two parts to accommodate the journal 316 of the roller 326 during installation. In some examples, a composite heating coil arrangement having two (or even more) semi-circular independent induction coils may be provided, as shown in FIG. 5B (Option A). This configuration allows the coils to be easily installed around the roller's journal 316 without the need for disassembly of the roller system 302.

In some examples, a single heating coil may have an incomplete circle shape, as shown in FIG. 5C (Option B). This design accommodates the roller's journal 502 by leaving a gap in the induction heating coil 306, allowing it to be positioned around the journal 316 without interference. While FIG. 5B and FIG. 5C show particular positions and sizes of the split heating coils, the present disclosure is not limited thereto, and other split positions and sizes may be possible. The flexibility in the design of the induction heating coils 306 ensures that they can be adapted to various roller configurations and installation requirements.

The split design of the induction heating coils 306 may serve multiple purposes. For example, it allows for the installation of the induction heater system 334 without requiring complete disassembly of the roller system 302.

This is particularly beneficial for retrofitting existing roller systems or for facilitating maintenance and replacement of the coils.

In the composite heating coil arrangement (Option A), each semi-circular coil may be independently powered and controlled. This configuration can provide more precise control over the heating pattern, allowing for adjustments to compensate for any asymmetries in the roller's thermal profile. The independent control may also enable more efficient power usage by allowing different power levels to be applied to each coil segment as needed.

The incomplete circle shape (Option B) may offer a simpler design that may be more cost-effective to manufacture and easier to install. This configuration may be particularly suitable for applications where the heating requirements are less demanding or where space constraints are more severe.

Both designs take into account the practical considerations of working with large industrial equipment. The ability to install the heating coils without major disassembly of the roller system 302 can reduce downtime and installation costs.

The flexibility in coil design also allows for optimization based on the specific thermal characteristics of different roller configurations. For example, the size and position of the split or gap can be adjusted to provide more intense heating to areas of the roller that experience greater heat loss, such as near the journal bearings.

Furthermore, the split design facilitates the use of flux concentrators or other magnetic field shaping elements, which can be positioned around the coils to focus and intensify the magnetic field in specific areas. This can lead to more efficient and targeted heating of the roller ends.

The adaptability of the induction heating coil design also extends to the manufacturing process. The coils can be custom-designed for specific roller sizes and configurations, ensuring optimal performance across a wide range of applications.

Figure 5D:
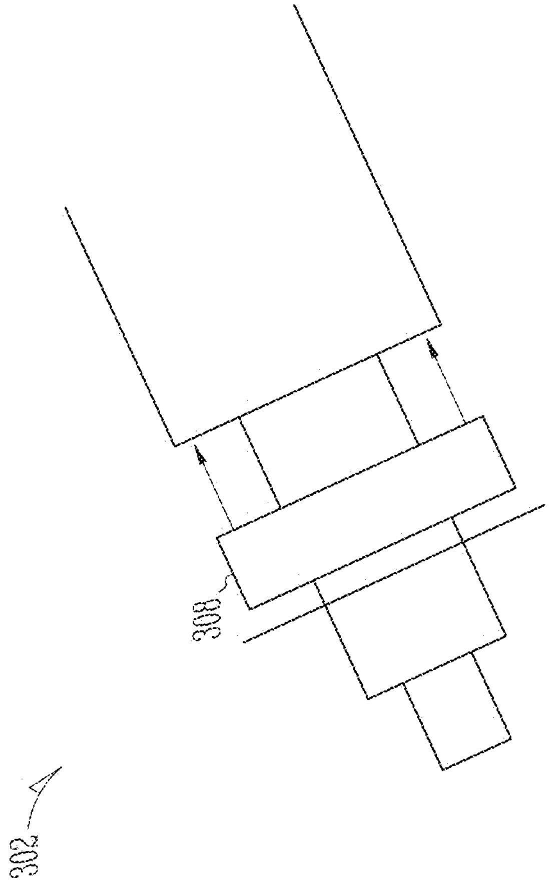
FIG. 5D illustrates how an induction heating coil (facing a heater plate) is installed into an end cap in one side of the roller according to some examples.
Figure 5E:
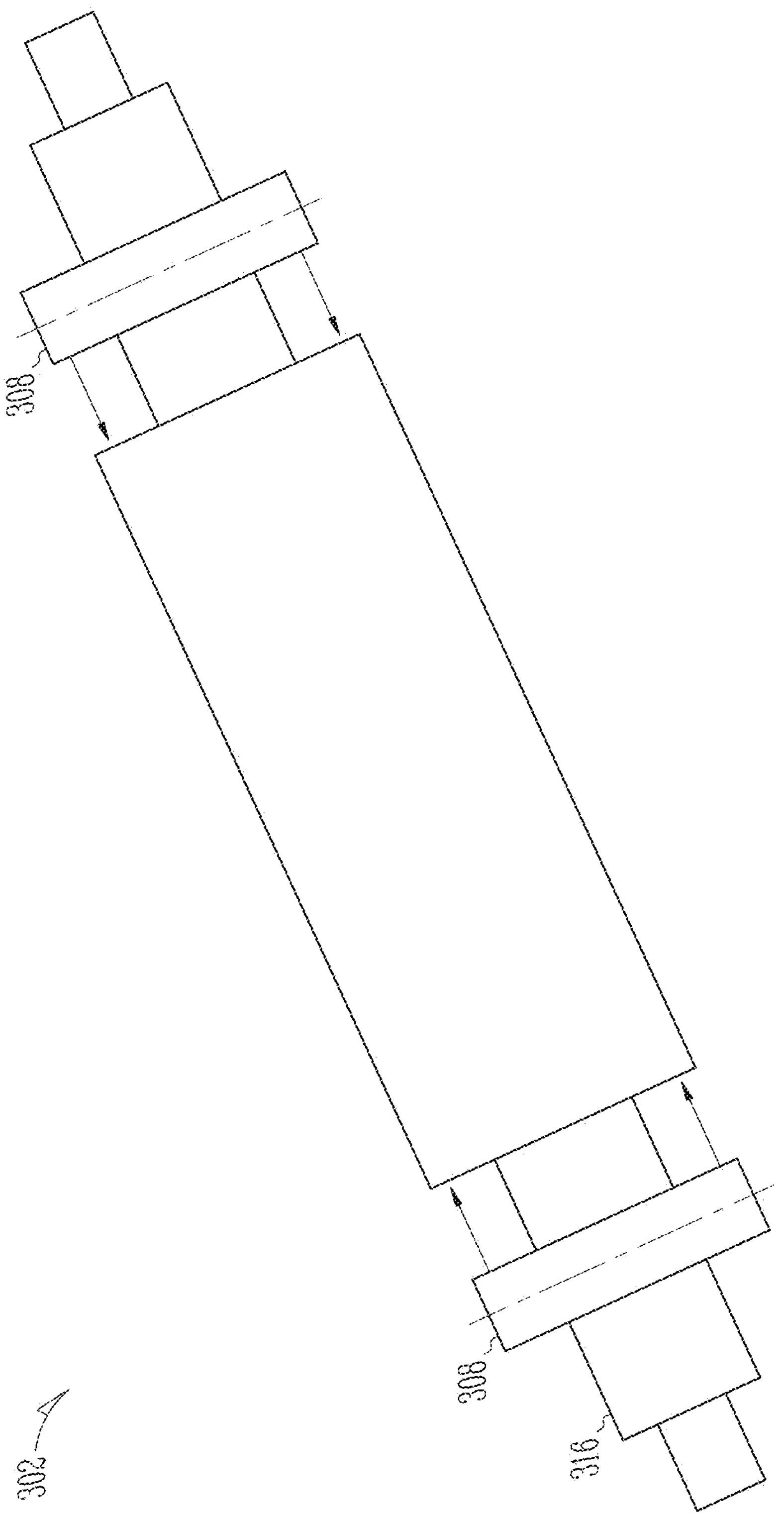
FIG. 5E illustrates how induction heating coils (surrounding a heater plates) are installed into end caps in opposing sides of the roller according to some examples.

FIG. 5D illustrates how the induction heating coil 306 (facing the heater plate 308) is installed into the roller system 302 by being secured on the end plates, according to some examples. FIG. 5E illustrates how induction heating coils 306 and 312 (surrounding the heater plates 308) are installed on end caps 310 on opposing sides of the roller system 302, according to some examples. While FIG. 5D shows an example where the induction heating coils 306 and 312 surround the heater plates 308; the induction heating coils 306 and 312 may face the heater plates 308, as shown in FIG. 5D. The induction heating coils 306 and 312 can face and completely or at least partially surround the heater plate 308 without physically contacting the heater plate 308.

In some examples where, the induction heating coils 306 and 312 surround the heater plate 308, as shown in FIG. 5A, the induction heating coils 306 and 320 may be directly coupled to the roller end caps 310 via coupling members such as screws, bushings, etc., while not physically contacting the heater plate 308. In some examples, each of the induction heating coils 306 and 312 may have an inner diameter greater than the outer diameter of the heater plate 308. In some examples, each of the induction heating coils 306 and 312 may not necessarily have an inner diameter greater than the outer diameter of the heater plate 308.

Each of the induction heating coils 306 and 312 can include one or more induction heating coils. Although FIG. 5A, FIG. 5D, and FIG. 5E show that each of the induction heating coils 306 and 312 includes two induction heating coils, the present disclosure is not limited thereto. For example, each of the induction heating coils 306 and 312 can include only one induction heating coil. As another example, each heating coil 306/312 can include two or more induction heating coils. As another example, each of the induction heating coils 306 and 312 can include three or more induction heating coils. As another example, one of the induction heating coils 306 and 312, can include only one inducting heating coil, whereas the other one of the heating coils, 306 and 312, can include two or more induction heating coils.

In some examples, only one of the induction heating coils 306 and 312 may operate to heat the corresponding end portion of the roller system 302. In these examples, the induction heating coils 306 or 312 may include only one induction heating coil or two or more induction heating coils.

In some examples, the roller system 302 can include an induction heating coil in only one end side thereof. For example, the roller system 302 can include only a left-side induction heating coil 306. The left side induction heating coil 306 may include only one induction heating coil, or two or more induction heating coils. As another example, the roller system 302 can include only a right-side induction heating coil 312. The right-side induction heating coils 312 may include only one induction heating coil, or two or more induction heating coils.

The roller system 302 can include an induction heating coil on both end sides thereof. The left and right induction heating coils 306 and 312 may have the same configuration. For example, the induction heating coils 306 and 312 may have the same number of turns of coils, the same size, and/or include the same material, etc. Alternatively, the left and right induction heating coils induction heating coil 306 and 312 may have different configurations. For example, the induction heating coils 306 and 312 may have a different number of turns of coils, different sizes, and/or include different materials, etc.

The left and right induction heating coils 306 and 312 may be controlled in the same way (e.g., synchronized) or controlled independently from each other. For example, the induction heating coils 306 and 312 may receive the same amount of voltage, current, or RF power, so as to generate the same amount of inductive current (e.g., eddy current). Alternatively, the induction heating coils 306 and 312 may receive different amounts of power, so as to generate different amounts of induction current. The left and right induction heating coils 306 and 312 may be operated at different times or for different durations. For example, voltage, current, or RF power can be applied to the left-side induction heating coil 306 for a first duration of time (e.g., 5-10 minutes) whereas voltage, current, or RF power can be applied to the right-side induction heating coil 312 for a second duration of time (e.g., 7-12 minutes) different from the first duration of time.

The amount of power can be different depending on the duration of time. For example, the longer the duration is, the less amount of power may be applied. As a non-limiting example, if 1 kw RF power is applied to an induction heating coil for about 10 minutes, 2 kw RF power may be applied to the same induction heating coil for less than about 10 minutes, for example, about 5 minutes. These times are merely examples, other times can also be used (e.g., about 30 seconds, about 1 minute, about 2 minutes, about 3 minutes, about 4 minutes, about 5 minutes, about 6 minutes, about 7 minutes, about 8 minutes, about 9 minutes, about 10 minutes, or any other time therebetween, or any other time therearound, etc.). Furthermore, voltage, current, or RF power can be applied for less than about 30 seconds or more than about 10 minutes, depending on the example.

One of the left and right induction heating coils 306 and 312 may receive power before the other one of the left and right induction heating coils 306 and 312 receives voltage, current, or RF power (delayed heating). For example, the left-side induction heating coil 306 may receive power about 30 seconds to about 5 minutes before the right-side induction heating coil 312 receives voltage, current, or RF power. As another example, the right-side induction heating coil 312 may power about 30 seconds to about 5 minutes before the left induction heating coil 310 receives voltage, current, or RF power. These times are merely examples, other delayed times less than about 30 seconds or greater than about 5 minutes can also be used.

At least one of the left and right induction heating coils 306 and 312 may constantly receive power. For example, at least one of the left and right induction heating coils 306 and 312 may continuously receive power while the roller is operating. At least one of the left and right induction heating coils 310 and 320 may intermittently receive power. For example, one or both of the left and right induction heating coils 306 and 312 may receive power every five minutes after the roller starts to operate. In some examples, one of the left and right induction heating coils 310 and 320 may receive power every five minutes whereas the other one of the left and right induction heating coils 306 and 312 may receive voltage, current, or RF power every three minutes. These times are merely examples, and other intermittent times can also be used.

At least one of the left and right induction heating coils 306 and 312 may receive power before the roller system 302 operates (pre-heating). For example, one or both of the left and right induction heating coils 306 and 312 may receive power about five to ten minutes before the roller system 302 operates in order to preheat the roller ends. By preheating the roller ends, the diameter of the roller can be thermally expanded to be closer to or match the diameter of the middle portion. This thermal expansion helps to maintain a consistent roller diameter across its length, which in turn contributes to producing a uniform material layer on the substrate. These times are merely examples, and other pre-heating times can also be used. The pre-heating times may vary depending on the amount of power.

In some examples, roller temperature may be monitored, as noted above, to determine whether rollers are sufficiently heated before or during operation. For example, the roller temperature in which the rollers are sufficiently heated may be in a range of about 100 degrees to about 200 degrees Celsius. A temperature sensor 322 may be used to determine the roller temperature. The temperature sensor may be disposed adjacent to an end portion of the rollers to detect the temperature of the roller end portion. The degree of roller heating can be monitored or controlled in various ways. For example, a predetermined amount of power (e.g., RF power) and/or power application time can be used to control a heating level or temperature of the rollers. The roller diameter can be continuously measured while inductive heating is applied to roller end caps. In some examples, a feedback loop can be used to determine a particular temperature of the roller end caps or diameters of roller end portions.

In some examples, only one of two rollers can be heated by induction heating coils. For example, only one of an upper roller or a lower roller may be heated via induction heating. In other examples, both the upper and lower or adjacent rollers can be heated by induction heating coils. In either scenario, one or both sides of each roller can be heated by induction heating coils as described above. In some examples, both of the upper and lower or adjacent rollers can be heated to a temperature lower than a temperature in which only one of the two rollers is heated.

Figure 6:
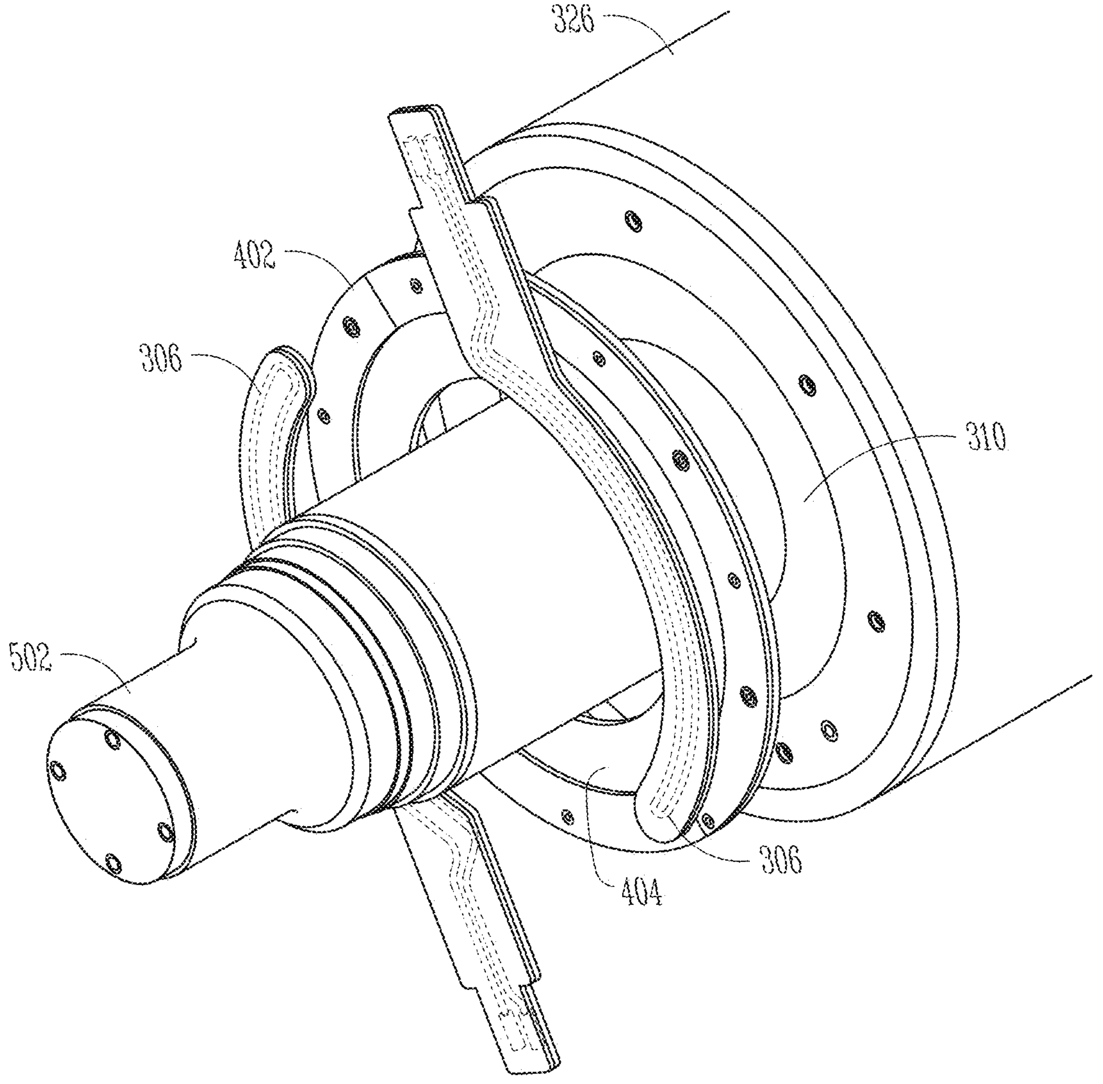
FIG. 6 illustrates an aspect of the subject matter in accordance with one embodiment.

FIG. 6 is a perspective view of a roller system with a two-coil induction heating configuration, according to some examples.

The roller system includes a roller 326, which is configured to rotate during operation. The roller 326 has an end cap 310, which is secured to the roller using multiple fasteners. The end cap 310 serves as a mounting point for the heater plate 308 and other components of the induction heating assembly.

The heater plate 308 comprises two main components: a first ring 402 and a second ring 404. The first ring 402 is constructed from a ferromagnetic material, such as steel. This ring is designed to generate eddy currents in response to an electromagnetic field. The second ring 404 is made of a thermally conductive material, such as copper. Its primary function is to transfer heat generated by the eddy currents to the roller 326. The first ring 402 and the second ring 404 are coupled together and mounted to the end cap 310.

The induction heating assembly incorporates two or more induction heating coils 306. These coils are positioned adjacent to the heater plate 308. The multi-coil configuration may offer advantages, including installation flexibility, independent or joint control, and enhanced heating precision.

The induction heating coils 306 generate an electromagnetic field based on supplied power, such as RF power. This electromagnetic field induces eddy currents in the first ring 402, which in turn generates heat. The heat is then transferred from the first ring 402 to the second ring 404 and subsequently to the roller 326 via thermal conduction.

The split design of the semi-circular independent induction heating coils 306 allows for easy installation around the roller's journal without requiring the disassembly of the roller system. This configuration facilitates retrofitting of existing roller systems and simplifies maintenance or replacement of the coils. The split coils may be connected in series, functioning as a single coil while maintaining high circumferential coverage of the heating area.

Each semi-circular coil can be independently powered and controlled, enabling precise adjustment of the heating pattern. This independent control allows for the compensation of asymmetries in the roller's thermal profile by applying different power levels to each coil segment as needed. Alternatively, the coils may be controlled jointly to provide uniform heating when required. The control unit 314, incorporating temperature control 328 and PID control 330, processes information from temperature sensors 322 and the in-line metrology device 332 to determine optimal or desired power distribution to the coils.

In some examples, the roller system 302 may incorporate more than two coils, such as three or four semi-circular coils, to provide even greater flexibility and precision in heating control. The number of coils may be determined based on the specific requirements of the roller system, the desired level of heating control, and the roller's dimensions. For instance, larger rollers or those requiring more precise temperature control may benefit from additional coils.

The induction heating coils 306 may be shaped to encompass approximately one quadrant of the circumference of the bearing block facing the roller end. This design increases the magnetic field distribution while minimizing interference with other components of the roller system. The coils are mounted on a fixed journal bearing 110 or bearing block, ensuring they remain stationary while the roller rotates.

The power supplied to the induction heating coils 306 is generated by a power generator 304, which converts AC input power into RF energy. This RF energy is then emitted by the induction coils to induce heat in the heat distribution plate (heater plate 308). The control unit 314 modulates this power output based on real-time feedback from temperature sensors and material thickness or density measurements, ensuring optimal heating performance throughout the roller operation.

The induction heating coils 306 are mounted on a fixed journal bearing 110. This mounting arrangement ensures that the coils remain stationary while the roller 320 rotates. The non-contact design of the induction heating coils 306 allows for efficient heating without physical contact with the heater plate 308. This design feature reduces wear and precision requirements.

Figure 7:
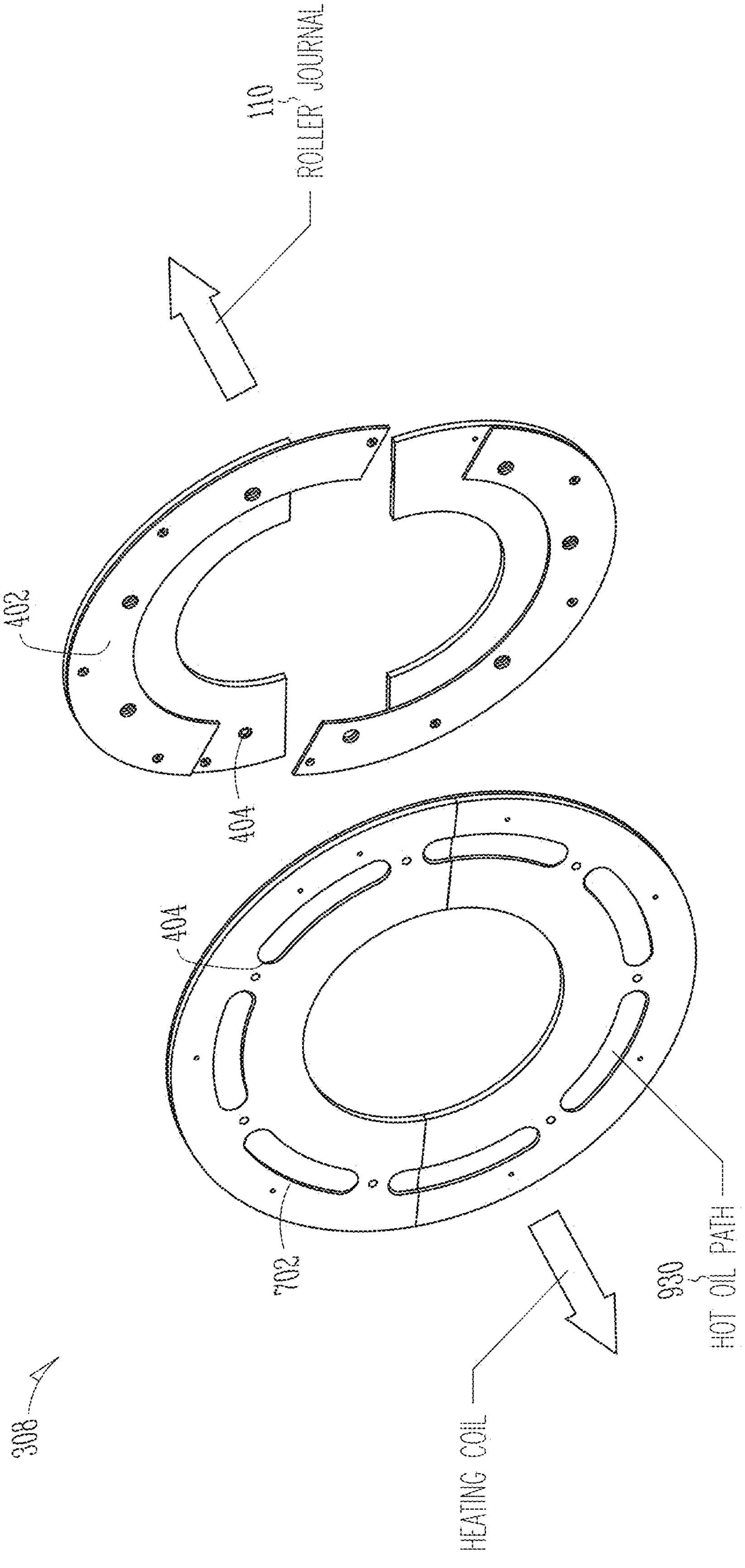
FIG. 7 is an exploded view showing an example heater plate or ring assembly to be installed on one or both end caps of the rollers according to some examples.

FIG. 7 is an exploded view showing an example heater plate 308 (or a ring assembly) to be installed on one or both end caps in the roller according to some examples. The heater plate 308 may include a first ring 402 and a second ring 404, as noted above with respect to FIG. 3.

As described above with respect to FIG. 5E, the induction heating coil 306 may surround (e.g., without contacting) a circumferential edge of the heater plate 308. The induction heating coil 306 may surround at least one of the first ring 402 or the second ring 404. For example, the induction heating coil 306 may surround the first ring 402 to inductively transfer eddy current to the first ring 402 or inductively generate eddy current on the first ring 402. However, the induction heating coil 306 may surround the second ring 404 or both of the first ring 402 and the second ring 404 as long as the eddy current can be inductively generated in the first ring 402.

The heater plate 308 can be mounted to each of two end caps 310 of a rotating roller (see FIG. 3). An induction heating coil 306 can be mounted to a fixed journal bearing 110 and may face this rotating heater plate 308 and provide efficient contactless heating of the first ring 402. The second ring 404 can transfer the heat from the first ring 402 towards a center journal of the roller 326 to make up heat that is otherwise lost to a journal bearing 110 cooling circuit. The induction heating coil 306 may be fixed while the heater plate 308 is rotated with the roller.

The first and second rings 402 and 404 may have substantially the same outer diameter. For example, the outer diameter may be in the range of about 670 mm to about 710 mm, such as about 670 mm, about 680 mm, about 690 mm, about 700 mm, about 710 mm, or any diameter therebetween. These diameters are merely examples, and the present disclosure is not limited thereto. For example, other outer diameters less than about 670 mm or larger than about 710 mm may also be used.

The first ring 402 may have an inner diameter larger than the inner diameter of the second ring 404. The inner diameter of the first ring 402 may be in the range of about 470 mm to about 510 mm, such as about 470 mm, about 480 mm, about 490 mm, about 500 mm, about 510 mm, or any diameter therebetween. These diameters are merely examples, and the present disclosure is not limited thereto. For example, the first ring 402 may have other inner diameters less than about 470 mm or larger than about 510 mm.

The inner diameter of the second ring 404 may be in the range of about 330 mm to about 370 mm, such as about 330 mm, about 340 mm, about 350 mm, about 360 mm, about 370 mm, or any diameter therebetween. These second ring inner diameters are merely examples, and the present disclosure is not limited thereto. For example, the second ring 404 may have other inner diameters less than about 330 mm or larger than about 370 mm.

The first and second 402 and 404 may be formed of or include different materials such that the first ring 402 may generate heat based on the inductive current and the second ring 404 may transfer the heat to the roller end portion via conduction. The first ring 402 may be formed of or comprise steel, and the second ring 404 may be formed of or comprise copper. These materials are merely examples and other materials can also be used as long as they generate and conduct heat to roller end portions.

The second ring 404 may include one or more oil by-pass pockets 702 that are aligned with hot oil paths and can prevent or minimize heat transfer to a radially outer region of the second ring 404. In the roller system 302, hot oil may circulate through internal oil heating lines to maintain a consistent temperature along the length of the roller. These oil heating lines are part of a circuit within the roller that circulates heated oil (or another fluid) to distribute heat evenly. However, the presence of these oil heating lines can also lead to unintended heat dissipation, especially if the heat generated by the induction heating system is transferred into the oil paths. This would result in inefficient heating and potential thermal imbalances within the roller.

The oil by-pass pockets 702 in the second ring 404 are designed to address this issue. These pockets are cutouts or recesses that align with the hot oil paths, creating a thermal barrier that prevents the heat from being transferred into the oil heating lines. By doing so, the pockets ensure that the heat generated by the induction heating coils is directed towards the roller ends, where it is needed to compensate for the heat loss caused by the bearing cooling circuit. This targeted heating helps to maintain a uniform temperature distribution along the roller's length, preventing thermal crowning and ensuring a consistent roller diameter.

Without these pockets, the heat generated by the induction heating system may be absorbed by the circulating oil, leading to inefficient heating and potential thermal gradients within the roller. This may further undermine the effectiveness of the induction heating system and could result in uneven material thickness during the rolling process. By incorporating the oil by-pass pockets 702, the design of the second ring 404 seeks to efficiently transfer heat to the roller ends.

Each of the first ring 402 and the second rings 404 may include two or more separate pieces (e.g., two halves). A first half of the first ring 402 may be coupled to a corresponding first half of the second ring as shown in FIG. 7. A second half of the first ring 402 may be coupled to a corresponding second half of the second ring as shown in FIG. 7. The halves may be coupled to each other using coupling members such as rivets or flat-head screws. Other coupling members or mechanisms, such as adhesive, magnet, welding, etc., can also be used. The halves may be coupled to each other before they are coupled to roller end caps.

The first half of the first ring 402 may be asymmetrically arranged with respect to the first half of the second ring 404 for easy coupling as shown in FIG. 7. The second half of the first ring 402 may be asymmetrically arranged with respect to the second half of the second ring 404 for easy coupling as shown in FIG. 7.

The split ring assemblies can be fastened to roller ends using fasteners. For example, holes, such as 7×M16 holes (that are used for coupling roller end caps), can be used. However, the present disclosure is not limited thereto, and other types or sizes of holes or fasteners can be used. 7×M16 screws may preload a sealing gasket to seal the ends of the rollers. The M16 screw may have internal threads that can provide mounting points while maintaining the gasket preload.

The heater plate 308 may be coupled to the roller end using coupling members. For example, M8 flat-head cap screw (FHCS) and one or more bushings may be used to fasten the heater plate 308 to the roller end cap. The one or more bushings can be screwed into the back of the heater plate 308. The M8 fasteners and bushings can press the first ring 402 (e.g., steel ring) to preload joints and thermal paste may be applied between the joints. One or more fasteners may be a flush or sub-flush fastener. Again, the coupling members or mechanisms described above are merely examples, and the present disclosure is not limited thereto.

Figure 8:
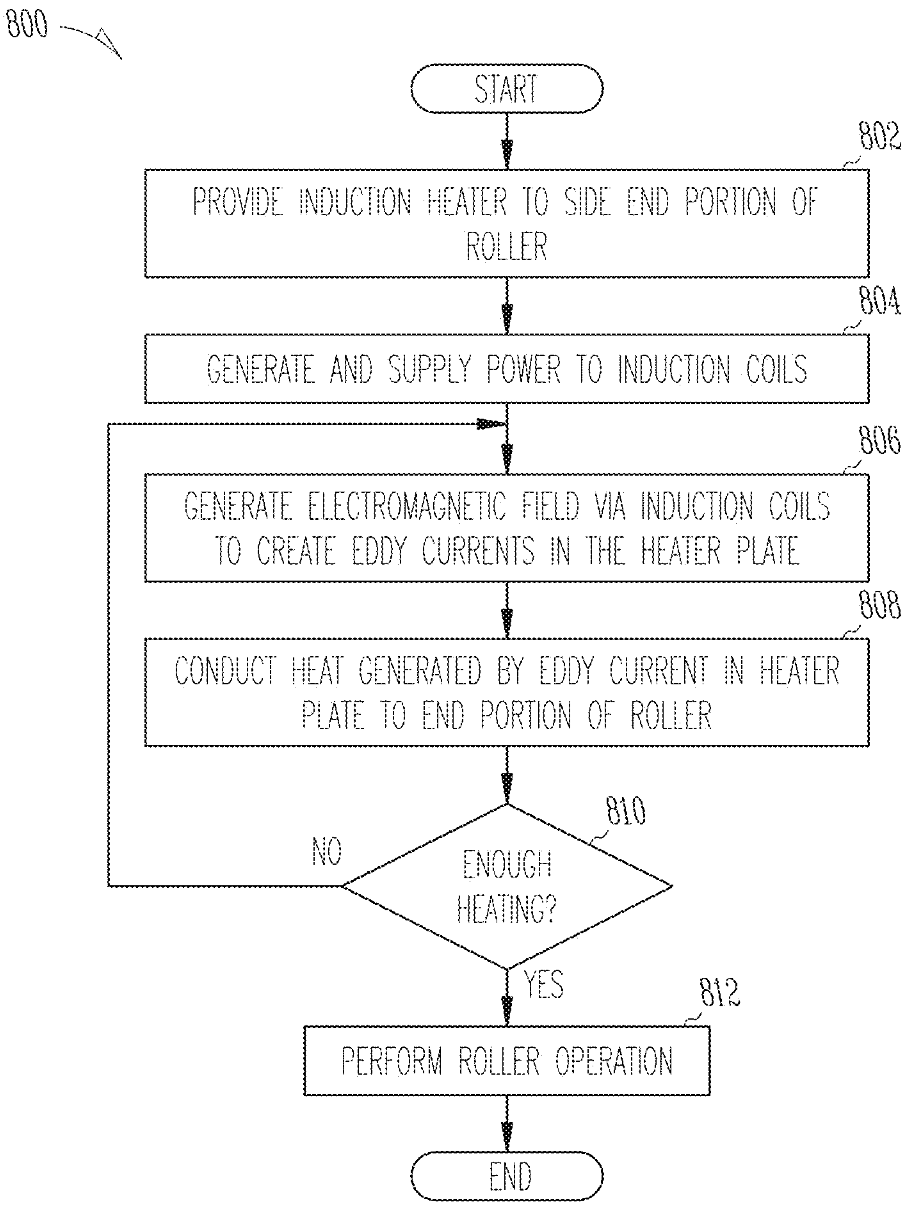
FIG. 8 is an example flowchart showing how inductive heating is performed according to some examples.

FIG. 8 is a flowchart illustrating a method 800 of inductive heating of a roller, according to some examples. FIG. 8 is merely an example flowchart, and certain blocks may be removed, other blocks added, two or more blocks combined or one block can be separated into multiple blocks depending on the specification and requirements.

In block 802, an induction heater system 334 can be installed to a side end portion (e.g., end cap) of a roller. In block 804, power such as RF power may be generated by a power generator 304 and supply generated power to one or more induction heating coils 306.

In block 806, one or more induction heating coils 306 may generate an electromagnetic field based on the supplied power. The electromagnetic field can inductively generate current (e.g., eddy current) in the steel first ring 402 of the heater plate 308.

In block 808, the steel first ring 402 of the heater plate 308 may generate heat based on the eddy current and transfer the heat to an end portion of the roller.

In block 810, it is determined whether the end portion of the roller is sufficiently heated. As described above, various methods can be used to determine whether the end portion of the roller is sufficiently heated. For example, a temperature on the end portion of the roller can be sensed, and it can be determined that the end portion of the roller is sufficiently heated in response to a sensed temperature exceeding a threshold temperature or in response to the sensed temperature being within a certain temperature range. As another example, one or more of i) the amount of power to one or more induction heating coils 306, ii) the number of heating coils, iii) the number of turns of each heating coil, or iv) a time period during which the power is supplied, can be used to determine that the end portion of the roller is sufficiently heated.

If it is determined that the end portion of the roller is not sufficiently heated, the blocks 806 and 808 may repeat until the end portion of the roller is sufficiently heated.

A feedback loop for at least one of temperature, the amount of power, or power application time can be used to determine whether the end portion of the roller is sufficiently heated as described above.

If it is determined in block 810 that the end portion of the roller is sufficiently heated, roller operation can be performed (block 812). The roller operation may include, but is not limited to, forming a film or a material layer on a base substrate by rolling the roller on the film or material layer against the base substrate.

During the roller operation, the temperature of the roller can be continually monitored using temperature sensors strategically placed adjacent to the end portions of the roller. These sensors provide real-time data on the roller's temperature, ensuring that the roller maintains the desired temperature range throughout the operation. If the temperature at the roller ends begins to drop below the optimal range, the induction heating system can be activated to intermittently heat the roller ends in real-time. This intermittent heating helps to compensate for any heat loss and maintain a consistent temperature distribution along the roller's length.

The real-time monitoring and intermittent heating are controlled by a feedback loop system. The feedback loop continuously compares the sensed temperature with a predefined threshold. If the temperature falls below the threshold, the system triggers the induction heating coils to generate an electromagnetic field, creating eddy currents in the heater plate 308. The generated heat is then conducted to the roller ends, restoring the temperature to the desired level. Once the temperature is back within the optimal range, the induction heating system can be temporarily deactivated until further heating is needed. This dynamic and responsive heating approach seeks to ensure that the roller maintains a uniform diameter and temperature.

Figure 9:
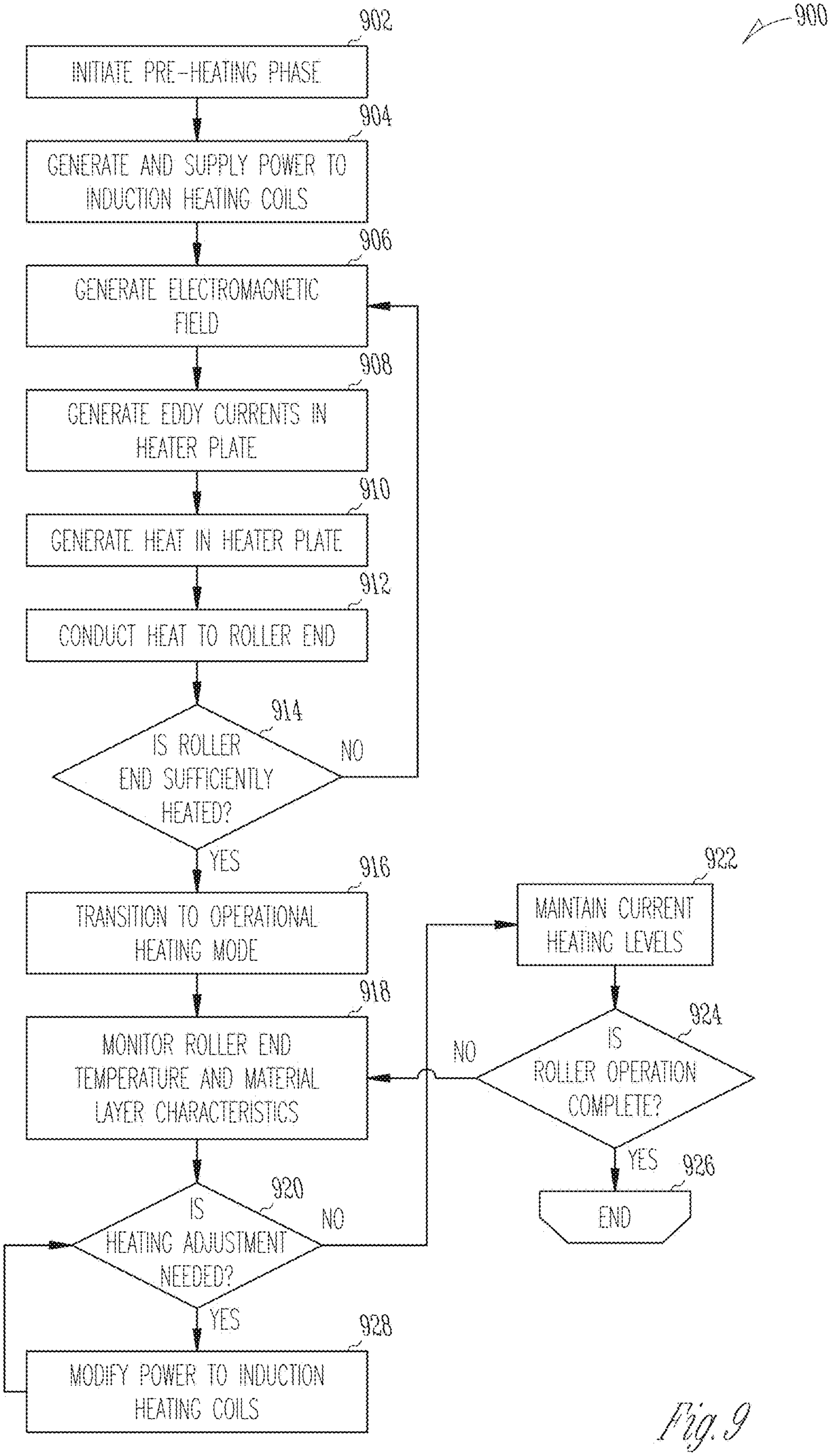
FIG. 9 illustrates an aspect of the subject matter in accordance with one embodiment.

FIG. 9 is a flowchart illustrating a method 900, according to some examples, of controlling an induction heating system for a roller used in manufacturing an electrode for an energy storage device. Although the example method depicts a particular sequence of operations, the sequence may be altered without departing from the scope of the present disclosure. For example, some of the operations depicted may be performed in parallel or in a different sequence that does not materially affect the function of the method. In some examples, different components of an example device or system that implements the method may perform functions at substantially the same time or in a specific sequence.

At block 902, the induction heater system 334 initiates a pre-heating phase. A control unit 314 may activate the induction heating system to begin heating the roller ends before roller operation commences.

At block 904, the induction heater system 334 generates and supplies power to one or more induction heating coils. The power generator may produce radio frequency (RF) power that is transmitted to the induction heating coils.

At block 906, the induction heating coils 306 generate an electromagnetic field based on the supplied power. This electromagnetic field interacts with the heater plate coupled to the roller end.

At block 908, the heater plate 308 generates eddy currents in response to the electromagnetic field. In some examples, a steel ring component of the heater plate may be primarily responsible for generating these eddy currents.

At block 910, the eddy currents generate heat in the heater plate 308. This heat may be primarily generated in the steel ring component.

At block 912, the generated heat is conducted from the heater plate 308 to the roller end. In some examples, a copper ring component of the heater plate 308 may facilitate efficient heat transfer to the roller end.

At decision block 914, the induction heater system 334 determines whether the roller end is sufficiently heated. This determination may involve using non-contact infrared sensors to measure the temperature of the heater plate or roller end.

If the roller end is not sufficiently heated, the method 900 returns to block 904 to continue heating. If the roller end is sufficiently heated, the process proceeds to block 918.

At block 916, the induction heater system 334 transitions to operational heating mode. In this mode, the roller begins its operation of forming the electrode material.

At block 918 the induction heater system 334 monitors the temperature of the roller ends and the thickness or loading density of the formed material layer. This monitoring may involve using non-contact infrared sensors for temperature measurement and in-line metrology equipment for material layer characteristics.

At decision block 920, the induction heater system 334 determines if heating adjustment is needed based on the monitored parameters. This decision may be made using a closed-loop Proportional-Integral-Derivative (PID) control system.

At block 928, if heating adjustment is needed, the induction heater system 334 modifies the power supplied to the induction heating coils. This adjustment may involve changing the amount of RF power or the duration of power application.

If heating adjustment is not needed, at block 922. the induction heater system 334 continues monitoring while maintaining current heating levels.

At decision block 924, the induction heater system 334 determines if the roller operation is complete. If not, the process returns to block 918 to continue monitoring and adjusting as needed. If the operation is complete, the process ends at closing loop block 926.

This method 900 allows for control of roller temperature, compensating for heat loss at the roller ends and maintaining a uniform diameter along the roller length. The system may continuously adjust heating based on real-time feedback from temperature sensors and material quality measurements, ensuring consistent electrode production throughout the manufacturing process.

Figure 10:
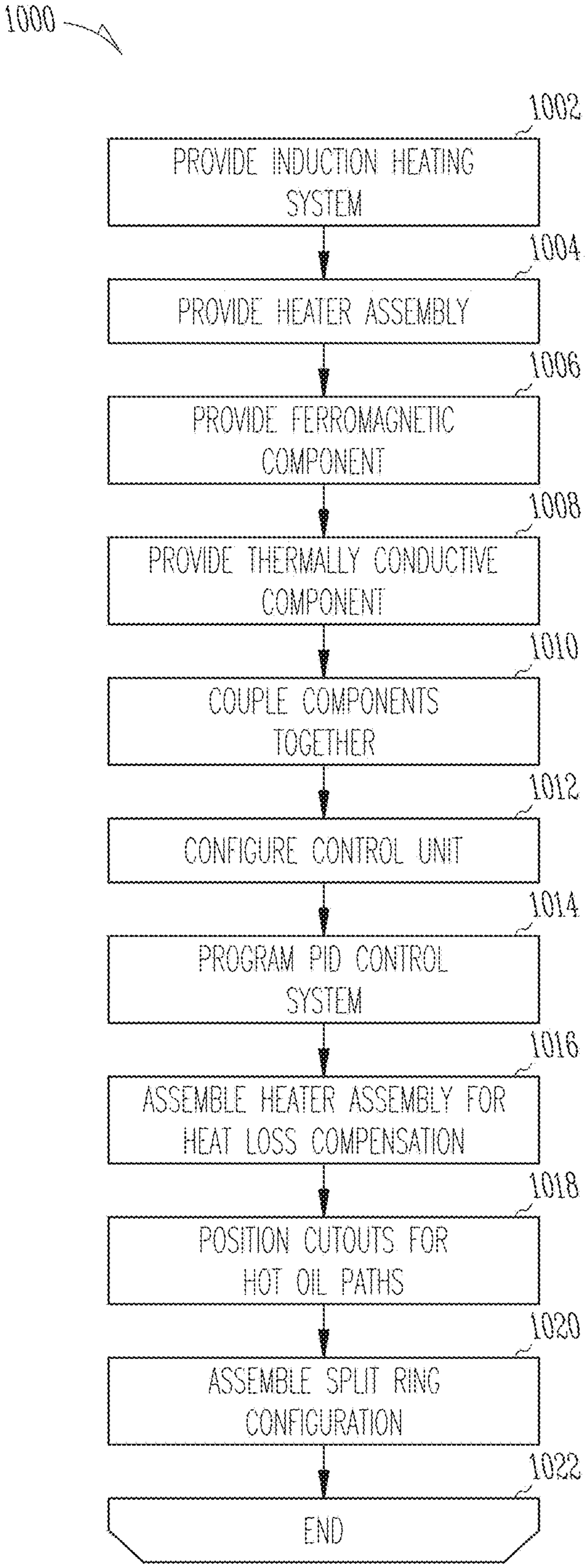
FIG. 10 illustrates an aspect of the subject matter in accordance with one embodiment.

FIG. 10 is a flowchart illustrating a method 1000, according to some examples, of manufacturing and installing a kit for retrofitting a roller system to reduce thermal crowning. Although the example method depicts a particular sequence of operations, the sequence may be altered without departing from the scope of the present disclosure. For example, some of the operations depicted may be performed in parallel or in a different sequence that does not materially affect the function of the method. In some examples, different components of an example device or system that implements the method may perform functions at substantially the same time or in a specific sequence.

At block 1002, the method 1000 begins with providing an induction heating system configured to generate a magnetic field. This may involve constructing one or more induction heating coils designed to be disposed adjacent to one or both ends of the roller.

At block 1004, the method 1000 proceeds to provide a heater assembly configured to be coupled to a roller. The heater assembly is designed to receive the magnetic field from the induction heating system and, in response, generate heat to thermally expand at least a portion of the roller when coupled.

At block 1006, the method 1000 involves providing a first component of the heater assembly made of a ferromagnetic material. This component is configured to generate eddy currents in response to receiving the magnetic field. In some examples, this first component may be a steel ring.

At block 1008, the method 1000 involves providing a second component of the heater assembly made of a thermally conductive material. This component is configured to transfer heat generated by the eddy currents to the roller when coupled. In some examples, this second component may be a copper ring.

At block 1010, the first and second components of the heater assembly are coupled together. This coupling may involve using flat head screws to fasten the steel and copper halves together.

At block 1012, the method 1000 involves configuring one or more non-contact infrared sensors to monitor the temperature of the heater assembly. These sensors may be positioned to measure the surface temperature of the heat distribution plate mounted to the roller end caps.

At block 1014, a control unit 314 is configured to control the induction heating system based on feedback from the one or more temperature sensors. This may involve programming the control unit to implement a closed-loop Proportional-Integral-Derivative (PID) control system.

At block 1016, the control unit 314 is further programmed to adjust the heating based on at least one of thickness or loading density of a material layer as measured by in-line metrology equipment. This equipment may include laser thickness gauges, beta or gamma ray thickness sensors, X-ray fluorescence analyzers, optical sensors, or capacitive/inductive sensors integrated into the production line.

At block 1018, the heater assembly is assembled to compensate for disproportionate heat loss from the ends of the roller when coupled. This design aims to maintain a substantially uniform temperature distribution along the length of the roller.

At block 1020, the method 1000 may include installing the heater assembly with cutouts that align with hot oil paths in the roller. These cutouts are intended to minimize heat transfer to the hot oil system while directing heat toward the core or center of the roller.

At block 1022, the method 1000 may involve installing the heater assembly as a split ring configuration to facilitate installation on existing rollers. This may include creating two halves of each ring that can be assembled offline and then mounted to the roller ends.

This method of manufacturing a retrofit kit allows for the creation of a system that can be applied to existing roller systems to address thermal crowning issues. The kit is designed to provide targeted heating to the roller ends, compensating for heat loss and maintaining a more uniform temperature distribution along the roller length, which in turn helps to maintain a consistent roller diameter and improve the quality of the manufactured material.

Figure 11:
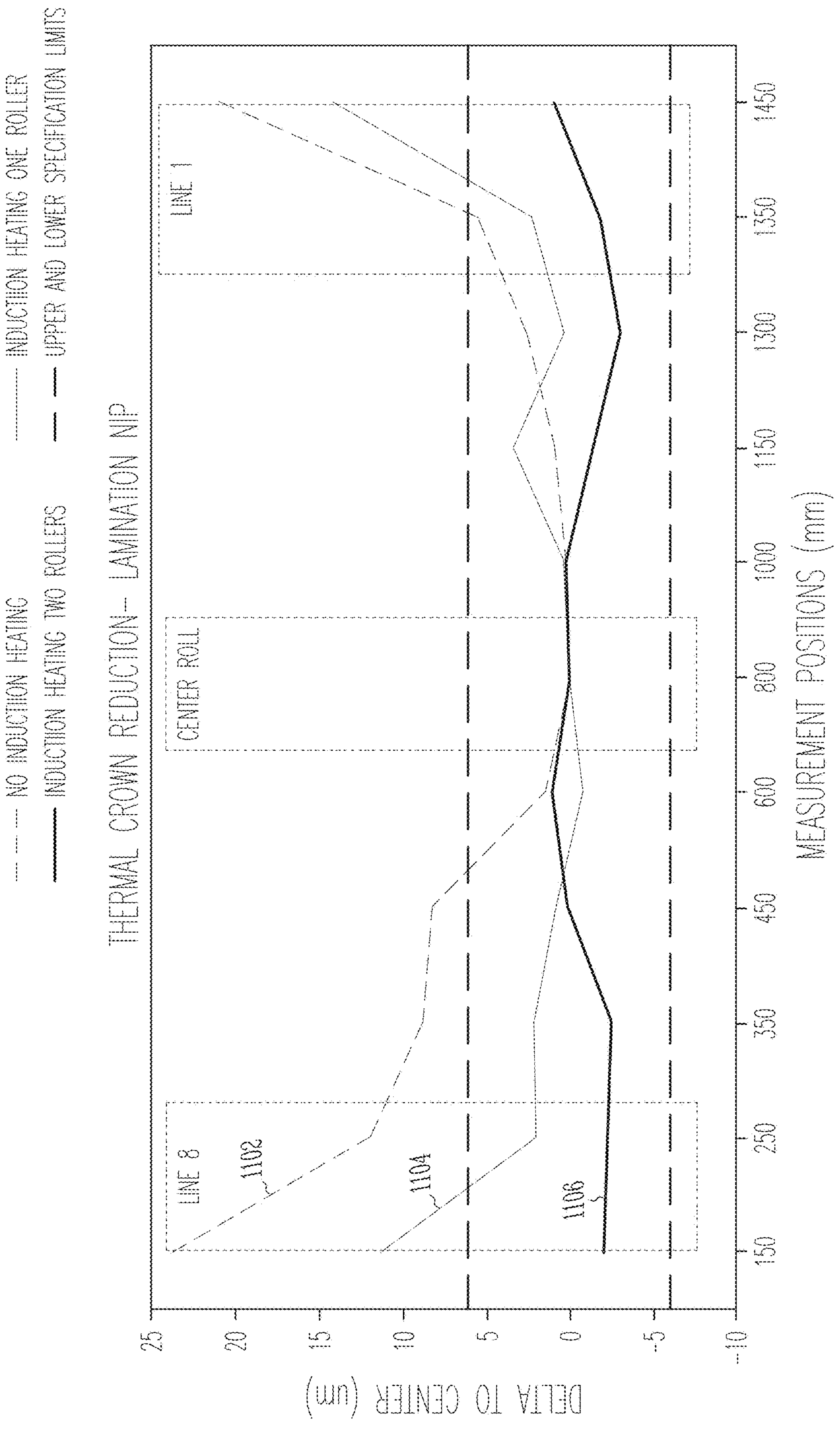
FIG. 11 illustrates thickness profiles of a material formed by a roller that uses induction heating and a roller that does not use induction heating.

FIG. 11 shows example thickness profiles of a material formed by a roller that uses induction heating and a roller that does not use induction heating. FIG. 11 shows three thickness profile 1102, 1102, 1104, and 1106, indicating thicknesses of a material (e.g., film) measured across the material from its center (indicated as "center roll" in FIG. 11) to sides (indicated as "Line 1" and "Line 8" in FIG. 11).

The thickness profile 1102 represents the thickness of the material formed on a base substrate (such as an electrode) when no induction heating is used. The thickness profile 1104 represents the thickness of the material when one of the two rollers is heated by one or more induction heating coils. The thickness profile 1106 represents the thickness of the material when both of the rollers are heated by one or more induction heating coils.

As shown in FIG. 11, the laser thickness profile has a reduced film thickness on the sides compared to the thickness profile 1102. Furthermore, the thickness profile 1106 has a reduced film thickness on the sides compared to the thickness profile 1102 and thickness profile 1104. The thickness profile 1106 has substantially similar or even film thicknesses across the axial length of the roller.

Figure 12A:
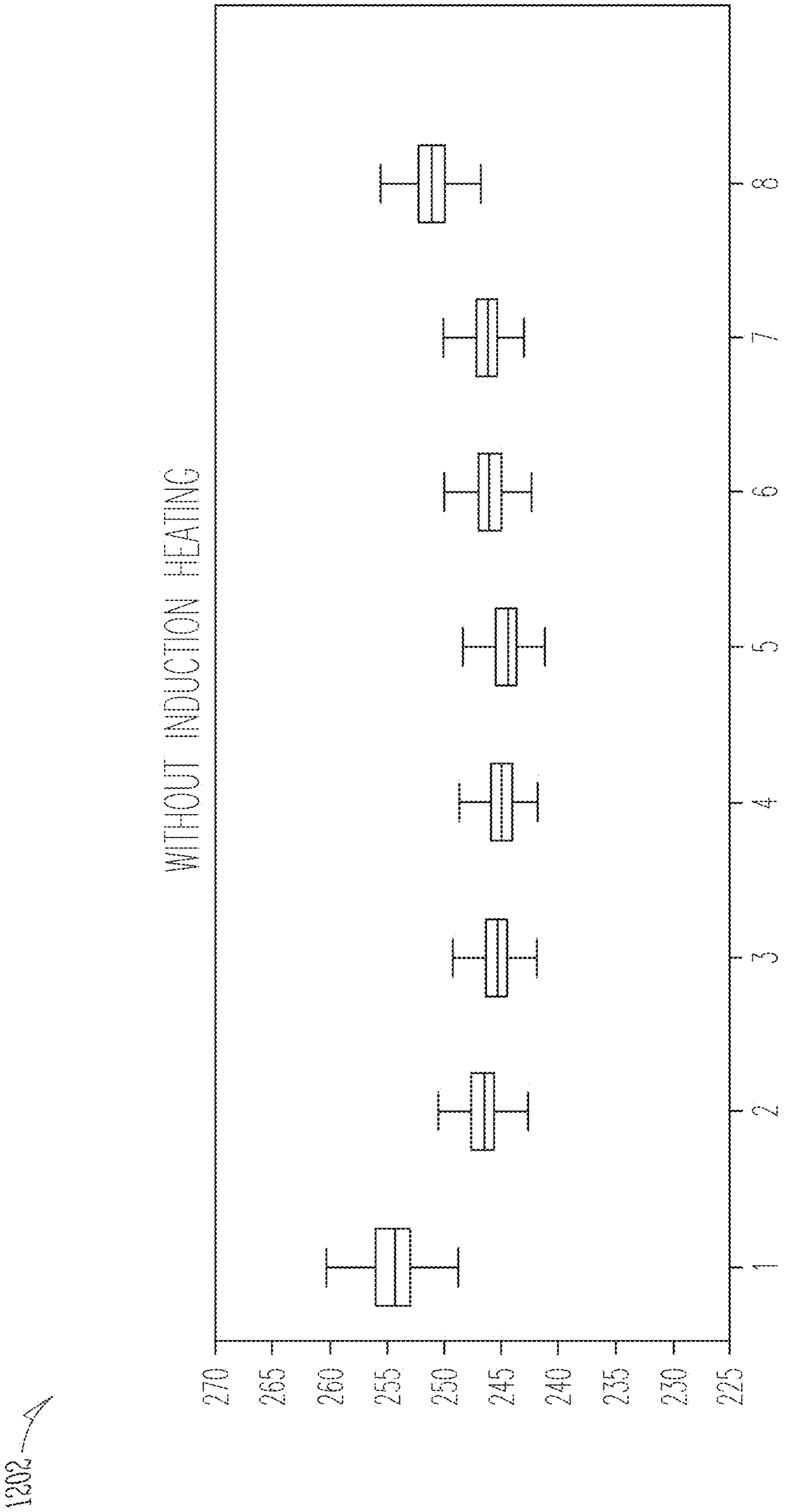
FIG. 12A illustrates a roller flatness profile obtained by a material thickness using a roller that does not use induction heating.
Figure 12B:
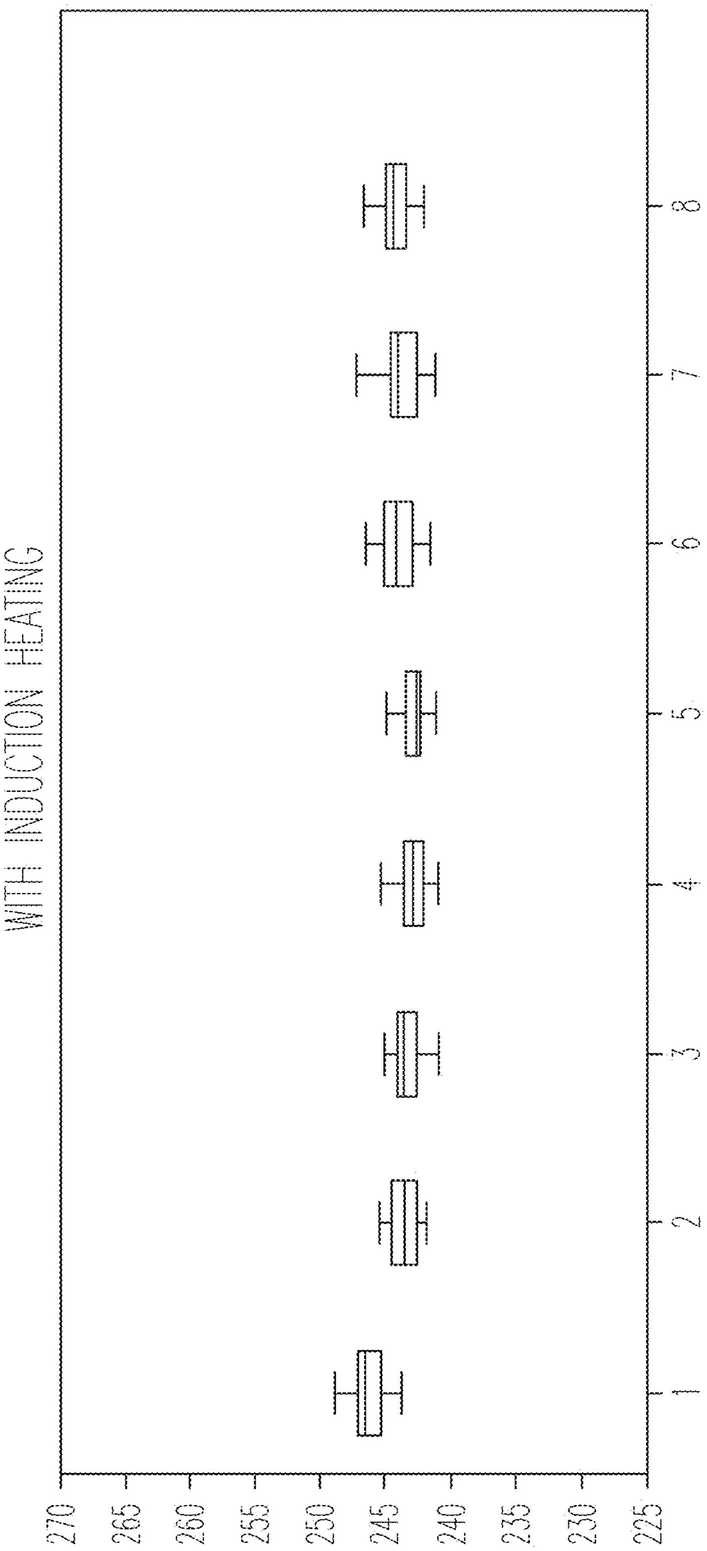
FIG. 12B illustrates a roller flatness profile obtained by a material thickness using a roller that uses induction heating according to some examples.

FIG. 12A is a roller flatness profile 1202 obtained by a material thickness using a roller that does not use induction heating. FIG. 12B is a roller flatness profile roller flatness profile 1204 obtained by a material thickness using a roller that uses induction heating according to some examples. As shown in FIG. 12A and FIG. 12B, the roller flatness profile 1204 using an induction heating roller is substantially even throughout the length of the roller compared to the roller flatness profile 1202 that does not use an induction heating roller. That is, various examples can flatten out a surface profile of calender or lamination rollers that are thermally crowned by providing an induction heating application to electromagnetically heat the two end caps of the roller with eddy currents so as to thermally expand the diameter of each end cap and maintaining a substantially equal or similar outer diameter along the axial length of the roller.

Figure 13A:
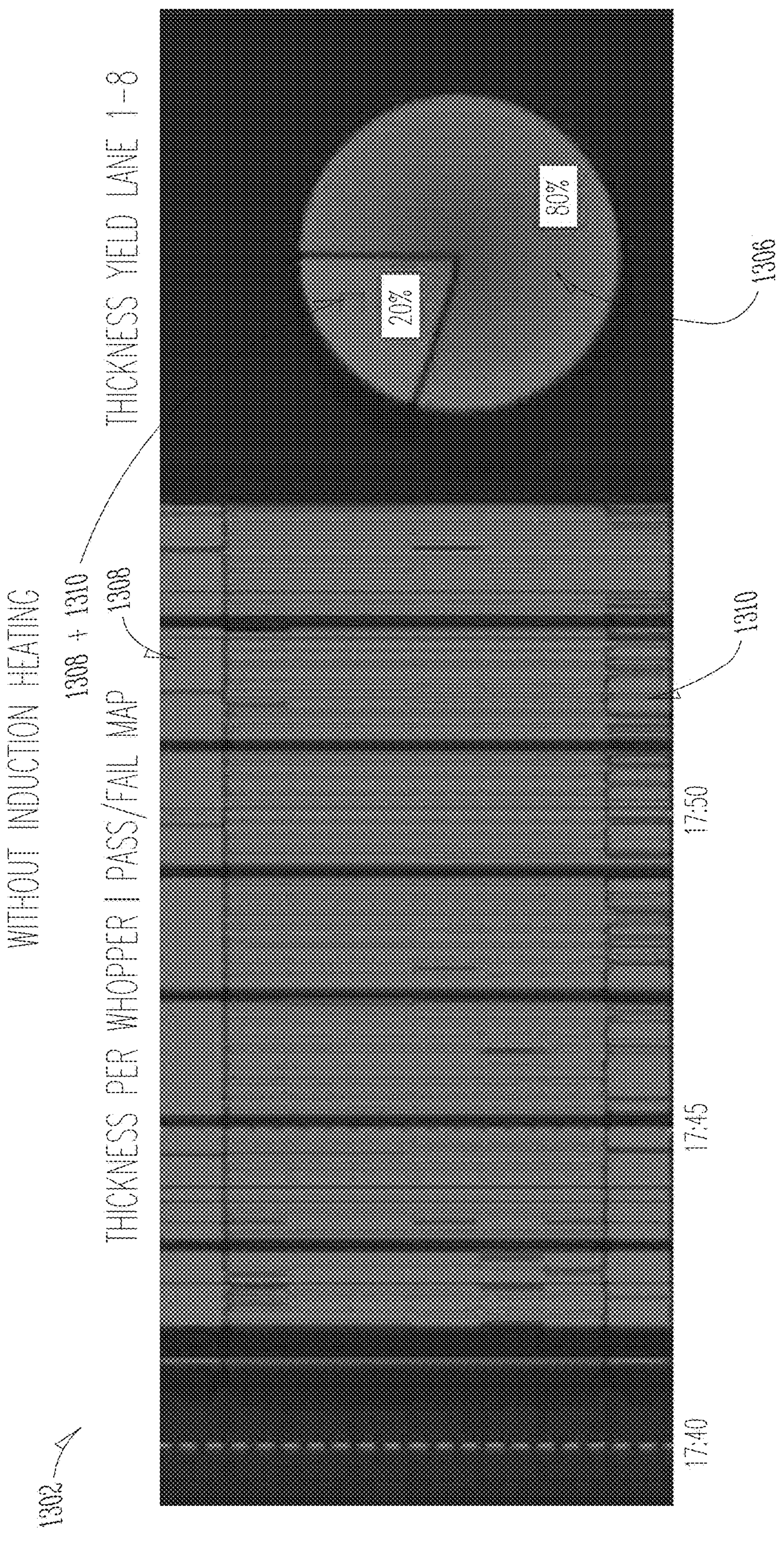
FIG. 13A illustrates a laser thickness profile of a material formed by a roller that does not use induction heating.
Figure 13B:
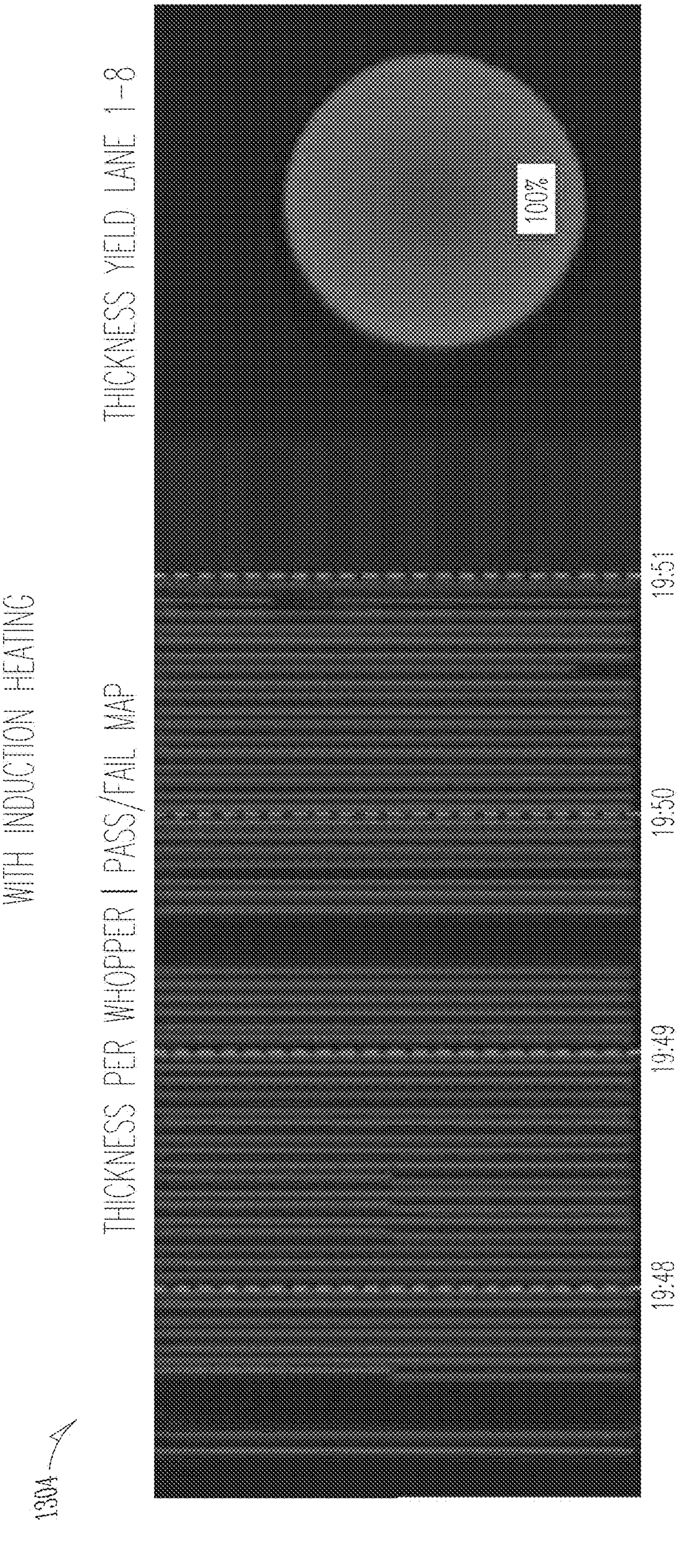
FIG. 13B illustrates a laser thickness profile of a material formed by a roller that uses induction heating according to some examples.

A laser thickness profile is a measurement technique used to determine the thickness of a material layer, such as a film or coating, applied to a substrate. This technique employs laser-based sensors to scan the surface of the material and generate a detailed profile of its thickness across different points. FIG. 13A shows a laser thickness profile 1302 of a material formed by a roller that does not use induction heating. FIG. 13B shows a laser thickness profile 1304 of a material formed by a roller that uses induction heating according to some examples. Referring to FIG. 13A, a middle portion 1306 of a coated electrode may be used for an acceptable coating thickness whereas side portions or upper and lower portions 712/714 of the coated electrode may not be used due to poor coating thicknesses. The middle portion 1306 of the coated electrode may constitute about 80% of the entire coated electrode whereas the upper portion 1308 and lower portion 1310 may constitute about 20%. In contrast, referring to FIG. 13B, substantially the entire portion (about 100%) of the coated electrode can have an acceptable coating thickness. So, it can be seen from FIG. 13A and FIG. 13B that the laser thickness profile 1304 obtained by induction heating is better in yield than the laser thickness profile 1302 that does not use induction heating.

Figure 14:
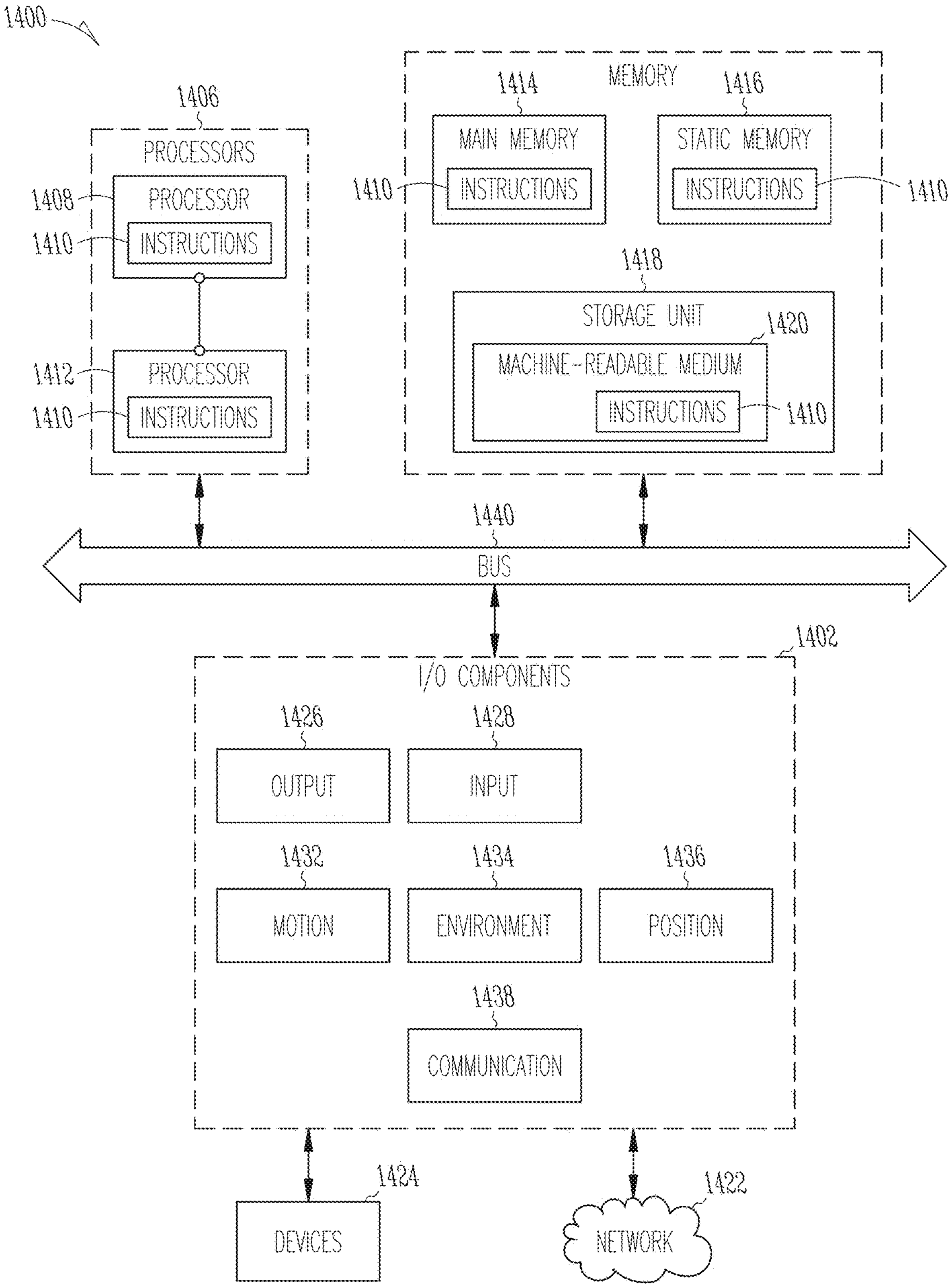
FIG. 14 is a diagrammatic representation of a machine in the form of a computer system within which a set of instructions may be executed for causing the machine to perform any one or more of the methodologies discussed herein, in accordance with some examples.

FIG. 14 is a diagrammatic representation of the machine 1400 within which instructions 1410 (e.g., software, a program, an application, an applet, an app, or other executable code) for causing the machine 1400 to perform any one or more of the methodologies discussed herein may be executed. In some examples, the machine 1400 may be the control unit 314 of the induction heater system 334.

The instructions 1410 may cause the machine 1400 to execute any one or more of the methods described herein. The instructions 1410 transform the general, non-programmed machine 400 into a particular machine 1400 programmed to carry out the described and illustrated functions in the manner described. The machine 1400 may operate as a standalone device or be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while a single machine 1400 is illustrated, the term "machine" may include a collection of machines that individually or jointly execute the instructions 1410 to perform any one or more of the methodologies discussed herein.

The machine 1400 may include processors 1404, memory 1406, and I/O components 1402, which may be configured to communicate via a bus 1440. In some examples, the processors 1404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), a Tensor Processing Unit (TPU), a Neural Processing Unit (NPU), a Vision Processing Unit (VPU), a Machine Learning Accelerator (MLA), a Cryptographic Acceleration Processor, a Field-Programmable Gate Array (FPGA), a Quantum Processor, another processor, or any suitable combination thereof) may include, for example, a processor 1408 and a processor 1412 that execute the instructions 1410.

Although FIG. 14 shows multiple processors 1404, the machine 1400 may include a single processor with a single core, a single processor with multiple cores (e.g., a multi-core processor), multiple processors with a single core, multiple processors with multiples cores, or any combination thereof. Modern processor architectures include superscalar, very long instruction word (VLIW), vector processor, multi-core, manycore, neuromorphic, and quantum architectures.

The memory 1406 includes a main memory 1414, a static memory 1416, and a storage unit 1418, both accessible to the processors 1404 via the bus 1440. The main memory 1406, the static memory 1416, and storage unit 1418 store the instructions 1410 embodying any one or more of the methodologies or functions described herein. The instructions 1410 may also reside, wholly or partially, within the main memory 1414, within the static memory 1416, within machine-readable medium 1420 within the storage unit 1418, within the processors 1404 (e.g., within the processor's cache memory), or any suitable combination thereof, during execution thereof by the machine 1400.

The I/O components 1402 may include various components to receive input, provide output, produce output, transmit information, exchange information, or capture measurements. The specific I/O components 1402 included in a particular machine depend on the type of machine. For example, portable machines such as mobile phones may include a touch input device or other such input mechanisms, while a headless server machine will likely not include such a touch input device. The I/O components 1402 may include many other components not shown in FIG. 14. In various examples, the I/O components 1402 may include output components 1426 and input components 1428. The output components 1426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), or other signal generators. The input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

The motion components 1432 include acceleration sensor components (e.g., accelerometer), gravitation sensor components, rotation sensor components (e.g., gyroscope). The environmental components 1434 include, for example, one or cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1436 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1402 further include communication components 1438 operable to couple the machine 1400 to a network 1422 or devices 1424 via respective coupling or connections. For example, the communication components 1438 may include a network interface Component or another suitable device to interface with the network 1422. In further examples, the communication components 1438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1424 may be another machine or any of a wide variety of peripheral devices (e.g., a peripheral device coupled via a USB).

Moreover, the communication components 1438 may detect identifiers or include components operable to detect identifiers. For example, the communication components 1438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Data glyph, Maxi Code, PDF417, Ultra Code, UCC RSS-2D bar code, and other optical codes), or acoustic detection components (e.g., microphones to identify tagged audio signals). In addition, a variety of information may be derived via the communication components 1438, such as location via Internet Protocol (IP) geolocation, location via Wi-Fi® signal triangulation, or location via detecting an NFC beacon signal that may indicate a particular location.

The various memories (e.g., main memory 1414, static memory 1416, and/or memory of the processors 1404) and/or storage unit 1418 may store one or more sets of instructions and data structures (e.g., software) embodying or used by any one or more of the methodologies or functions described herein. These instructions (e.g., the instructions 1410), when executed by processors 1404, cause various operations to implement the disclosed examples.

The instructions 1410 may be transmitted or received over the network 1422, using a transmission medium, via a network interface device (e.g., a network interface component included in the communication components 1438) and using any one of several well-known transfer protocols (e.g., hypertext transfer protocol (HTTP)). Similarly, the instructions 1410 may be transmitted or received using a transmission medium via a coupling (e.g., a peer-to-peer coupling) to the devices 1424.

The above-described induction heater can be used for a roller system for forming a material layer on a substrate to manufacture a cell electrode. The roller can include, but is not limited to, a calender roller, a lamination roller, or other material-forming roller. Furthermore, the above induction heater can be used for any calender/lamination/material forming roller application employing oil heating. Various examples may be applicable to manufacturing paper, textiles, rubber tires, plastic sheeting, or specialty polymers, i.e., Teflon. Induction heating could be employed to directly heat an electrode film, etc.

Features, materials, characteristics, or groups described in conjunction with a particular aspect or example are to be understood to be applicable to any other aspect or example described in this section or elsewhere in this specification unless incompatible therewith. All of the features disclosed in this specification (including any accompanying claims, abstract, and drawings) and/or all of the steps of any method or process so disclosed may be combined in any combination, except combinations where at least some of such features and/or steps are mutually exclusive. The protection is not restricted to the details of any foregoing examples. The protection extends to any novel one, or any novel combination, of the features disclosed in this specification (including any accompanying claims, abstract, and drawings) or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations, one or more features from a claimed combination can, in some cases, be excised from the combination, and the combination may be claimed as a sub combination or variation of a sub combination.

Moreover, while operations may be depicted in the drawings or described in the specification in a particular order, such operations need not be performed in the particular order shown or in sequential order, or all operations be performed to achieve desirable results. Other operations that are not depicted or described can be incorporated into the example methods and processes. For example, one or more additional operations can be performed before, after, simultaneously, or between any of the described operations. Further, the operations may be rearranged or reordered in other implementations. Those skilled in the art will appreciate that in some examples, the actual steps taken in the processes illustrated and/or disclosed may differ from those shown in the figures. Depending on the example, certain of the steps described above may be removed, and others may be added. Furthermore, the features and attributes of the specific examples disclosed above may be combined in different ways to form additional examples, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately or integrated together (e.g., packaged together or attached together) to form an energy storage system.

For purposes of this disclosure, certain aspects, advantages, and novel features are described herein. Not necessarily all such advantages may be achieved in accordance with any particular example. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without user input or prompting, whether these features, elements, and/or steps are included or are to be performed in any particular example.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result.

The scope of the present disclosure is not intended to be limited by the specific disclosures of examples in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.\

While certain examples have been described, these examples have been presented by way of example only, and are not intended to limit the scope of the disclosure. Indeed, the novel methods and systems described herein may be embodied in a variety of other forms. Furthermore, various omissions, substitutions, and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Examples

Example 1 is a roller system for forming a material layer on a substrate, comprising: a first roller configured to rotate; and a second roller configured to rotate in proximity to the first roller, the first and second rollers together configured to press a material layer on a substrate interposed therebetween, at least one of the first roller or the second roller comprising an induction heater, the induction heater comprising: a power generator configured to generate power; one or more induction heating coils disposed adjacent to one or both ends of at least one of the first roller or the second roller and configured to generate an electromagnetic field based on the power; and a heater plate surrounding the one or both ends of at least one of the first roller or the second roller, the heater plate configured to: receive the electromagnetic field from the one or more induction heating coils; and generate an eddy current based on the electromagnetic field, the eddy current configured to generate heat on the heater plate based on electromagnetic field induction such that the generated heat is transferred to the one or both ends of at least one of the first roller or the second roller via thermal conduction so as to thermally expand a diameter of the one or both ends of at least one of the first roller or the second roller.

In Example 2, the subject matter of Example 1 includes, wherein the generated heat is configured to cause at least one of the first roller or the second roller to maintain a substantially similar outer diameter throughout an axial length of the rollers prior to or during operation of the rollers.

In Example 3, the subject matter of Examples 1-2 includes, wherein the one or more induction heating coils are disposed on both ends of each of the first and second rollers.

In Example 4, the subject matter of Examples 1-3 includes, wherein the one or more induction heating coils comprise a pair of heating coils spaced apart from each other.

In Example 5, the subject matter of Examples 1-4 includes, wherein the heater plate is disposed between the ends of the rollers and the one or more induction heating coils.

In Example 6, the subject matter of Examples 1-5 includes, wherein the electric power comprises at least one of voltage, current, or radio frequency (RF) power.

In Example 7, the subject matter of Examples 1-6 includes, wherein the one or more induction heating coils are fixed while the first and second rollers rotate.

In Example 8, the subject matter of Examples 1-7 includes, wherein the one or more induction heating coils do not contact the heater plate.

Example 9 is a roller heating system to heat one or more rollers, comprising: a power generator configured to generate power; one or more induction heating coils configured to be disposed adjacent to one or both ends of at least one of a first roller or a second roller and configured to generate an electromagnetic field based on the power; and a heater plate configured to: at least partially surround the one or both ends of at least one of the first roller or the second roller; receive the electromagnetic field from the one or more induction heating coils; and generate an eddy current based on the electromagnetic field, the eddy current to generate heat on the heater plate based on electromagnetic field induction such that the generated heat is transferred to the one or both ends of at least one of the first roller or the second roller via thermal conduction so as to thermally expand a diameter of the one or both ends of at least one of the first roller or the second roller.

In Example 10, the subject matter of Example 9 includes, wherein the generated heat is configured to cause at least one of the first roller or the second roller to maintain a substantially similar outer diameter throughout an axial length of the rollers prior to or during operation of the rollers.

In Example 11, the subject matter of Examples 9-10 includes, wherein the one or more induction heating coils face the heater plate without contacting the heater plate.

In Example 12, the subject matter of Examples 9-11 includes, wherein the one or more induction heating coils surround a circumferential edge of the heater plate without contacting the heater plate.

Example 13 is a roller heating system to heat one or more calender rollers, comprising: an RF power generator to generate RF power; and one or more induction heating coils to be disposed on one or both ends of at least one of a first roller or a second roller, the one or more induction heating coils configured to: receive the RF power from RF power generator; and generate an electromagnetic field based on the RF power, the electromagnetic field configured to generate an eddy current that generates heat to be transferred to the one or both ends of at least one of the first roller or the second roller via thermal conduction so as to thermally expand a diameter of the one or both ends of at least one of the first roller or the second roller.

Example 14 is a heater plate to heat one or more material forming rollers, comprising: a first ring having a first inner diameter and a first outer diameter; and a second ring having a second inner diameter less than the first inner diameter and a second outer diameter substantially the same as the first outer diameter, the first ring and the second ring coupled to each other such that the first and second outer diameters are substantially aligned, the coupled first and second rings configured to be coupled to and heat an end portion of at least one of the one or more material forming rollers, the first ring and the second ring comprising different materials.

In Example 15, the subject matter of Example 14 includes, wherein the first ring comprises steel, and the second ring comprises copper.

In Example 16, the subject matter of Examples 14-15 includes, wherein each of the first ring and the second ring comprises a first half and a second half, wherein the first half of the first ring is coupled to the first half of the second ring, and wherein the second half of the first ring is coupled to the second half of the second ring.

In Example 17, the subject matter of Examples 14-16 includes, wherein the first half of the first ring is asymmetrically arranged with respect to the first half of the second ring, and wherein the second half of the first ring is asymmetrically arranged with respect to the second half of the second ring.

In Example 18, the subject matter of Examples 14-17 includes, wherein the coupled first and second rings are configured to receive an electromagnetic field and generate an eddy current that generates heat to be transferred to the end portion of the at least one of the one or more material forming rollers via thermal conduction so as to thermally expand a diameter of the end portion.

In Example 19, the subject matter of Example 18 includes, wherein the first ring is configured to generate the eddy current and transfer the generated heat to the second ring, and wherein the second ring is configured to transfer the received heat to the end portion of the at least one of the one or more material forming rollers.

Example 20 is a method of manufacturing an electrode for an energy storage device using one or more rollers, comprising: providing one or more rollers; providing one or more induction heating coils to a side end of at least one of the one or more rollers, wherein a heater plate is coupled to the side end of the at least one of the one or more rollers; generating and supplying power to the one or more induction heating coils; generating an electromagnetic field via the one or more induction heating coils to create an eddy current in the heater plate, the eddy current generating heat on the heater plate; thermally conducting the heat from the heater plate to the side end of the at least one of the one or more rollers; determining whether the side end of the at least one of the one or more rollers is sufficiently heated; and in response to determining that the side end of the at least one of the one or more rollers is sufficiently heated, performing a roller operation to form an electrode.

In Example 21, the subject matter of Example 20 includes, wherein the roller operation comprises depositing a thin film on the electrode; rotating the at least one of the one or more rollers; and pressing the thin film against the electrode with the at least one of the one or more rollers being rotated such that the thin film is formed on the electrode.

In Example 22, the subject matter of Examples 20-21 includes, wherein the conducting comprises thermally expanding a diameter of the side end of the at least one of the one or more rollers such that the at least one of the one or more rollers maintains a substantially similar outer diameter throughout an axial length of the at least one of the one or more rollers prior to or during the roller operation.

In Example 23, the subject matter of Examples 20-22 includes, wherein determining whether the side end of the at least one of the one or more rollers is sufficiently heated comprises: sensing a temperature on the side end of the at least one of the one or more rollers; determining whether the sensed temperature is greater than a threshold temperature; and in response to determining that the sensed temperature is greater than the threshold temperature, determining that the side end of the at least one of the one or more rollers is sufficiently heated.

Example 24 is a system to mitigate thermal crowning in calender rollers, the system comprising: a heater assembly to be mounted on the ends of a calender roller; and an induction heating mechanism to generate eddy currents to heat the heater assembly, wherein the heater assembly comprises a first component constructed from a ferromagnetic material and a second component constructed from a thermally conductive material, the heater assembly facilitating directed heat transfer towards the ends of the roller to achieve a substantially uniform temperature distribution along the length of the roller.

In Example 25, the subject matter of Example 24 includes, wherein the ferromagnetic material is steel.

In Example 26, the subject matter of Examples 24-25 includes, wherein the thermally conductive material is copper.

In Example 27, the subject matter of Examples 24-26 includes, wherein the heater assembly is configured to be mounted to the roller ends with an air gap.

In Example 28, the subject matter of Examples 24-27 includes, a control unit to independently control the heating at each end of the roller.

In Example 29, the subject matter of Example 28 includes, wherein the control unit utilizes input from temperature sensors distributed along the roller to dynamically adjust the heating.

In Example 30, the subject matter of Examples 24-29 includes, wherein the induction heating mechanism comprises an induction coil positioned adjacent to the roller ends on a fixed bearing block.

In Example 31, the subject matter of Example 30 includes, wherein the induction coil is shaped to encompass approximately one quadrant of a circumference of the bearing block facing the roller end.

In Example 32, the subject matter of Examples 24-31 includes, wherein the heater assembly includes electromagnetic shielding components to prevent interference with operational sensors due to the induction heating.

In Example 33, the subject matter of Examples 24-32 includes, incorporating thermal interface materials at joints of the heater assembly to improve thermal contact and uniform heat distribution.

In Example 34, the subject matter of Examples 24-33 includes, wherein the heater assembly is adjustable to accommodate different roller sizes and configurations.

In Example 35, the subject matter of Examples 24-34 includes, wherein the induction heating mechanism is to vary intensity of the generated eddy currents.

In Example 36, the subject matter of Examples 28-35 includes, wherein the heater assembly includes a sensor to detect the temperature of the roller ends and to provide feedback to the control unit.

In Example 37, the subject matter of Examples 28-36 includes, wherein the control unit is programmable to follow a heating profile based on roller material properties and operational parameters.

Example 38 is at least one machine-readable medium including instructions that, when executed by processing circuitry, cause the processing circuitry to perform operations to implement of any of Examples 1-37.

Example 39 is an apparatus comprising means to implement any of Examples 1-37.

Example 40 is a system to implement any of Examples 1-37.

Example 41 is a method to implement any of Examples 1-37.

Example 42 is a roller system for forming a material layer on a substrate, comprising an inductive power generator to generate a magnetic field, an opposing member, and a roller proximal to the opposing member. The roller and opposing member are configured to press the material layer on the substrate interposed therebetween. The roller includes a heater plate thermally coupled to the roller, configured to receive the magnetic field from the inductive power generator and, in response, generate an eddy current and heat a portion of the roller to thermally expand a diameter of the roller.

In Example 43, the subject matter of Example 42, wherein the heater plate comprises a first ring to generate the eddy current and heat, and a second ring, thermally coupled to the first ring, to transfer the heat from the first ring to the portion of the roller.

In Example 44, the subject matter of Examples 42-43, wherein the first ring comprises a ferromagnetic material configured to generate the eddy current in response to receiving the magnetic field.

In Example 45, the subject matter of Examples 42-44, wherein the second ring comprises a thermally conductive material configured to transfer heat generated by the eddy current to the roller.

In Example 46, the subject matter of Examples 42-45, wherein the heater plate is configured to be secured to an end portion of the roller.

In Example 47, the subject matter of Examples 42-46, wherein the inductive power generator comprises one or more induction heating coils disposed adjacent to an end of the roller.

In Example 48, the subject matter of Examples 42-47, wherein the one or more induction heating coils are fixed while the roller rotates.

In Example 49, the subject matter of Examples 42-48, further comprising a control unit coupled to the inductive power generator and to operationally control the heating of the portion of the roller.

In Example 50, the subject matter of Examples 42-49, wherein the control unit is to utilize input from at least one temperature sensor that measures temperature along the roller to dynamically adjust the heating of the portion of the roller.

In Example 51, the subject matter of Examples 42-50, wherein the control unit is to control the inductive power generator using a closed-loop Proportional-Integral-Derivative (PID) control system based on at least one of thickness or loading density of the material layer as measured by in-line metrology equipment.

Example 52 is a kit for retrofitting a roller system to reduce thermal crowning, comprising an induction heating system to generate a magnetic field, and a heater assembly configured to be thermally coupled to a roller. The heater assembly is configured to receive the magnetic field from the induction heating system and, in response to receiving the magnetic field, generate heat to thermally expand at least a portion of the roller when thermally coupled to the roller.

In Example 53, the subject matter of Example 52, wherein the heater assembly comprises a first component made of a ferromagnetic material to generate eddy currents in response to receiving the magnetic field, and a second component made of a thermally conductive material to transfer heat generated by the eddy currents to the roller.

In Example 54, the subject matter of Examples 52-53, wherein the induction heating system comprises one or more induction heating coils configured to be disposed adjacent to one or both ends of the roller.

In Example 55, the subject matter of Examples 52-54, wherein the one or more induction heating coils are configured to be fixed to bearing blocks supporting the roller while the roller rotates.

In Example 56, the subject matter of Examples 52-55, wherein the one or more induction heating coils are split into two parts to accommodate a journal of the roller.

In Example 57, the subject matter of Examples 52-56, further comprising one or more temperature sensors to monitor a temperature of the roller, and a control unit configured to control the induction heating system based on feedback from the one or more temperature sensors.

In Example 58, the subject matter of Examples 52-57, wherein the control unit to control the induction heating system based on at least one of thickness or loading density of a material layer.

In Example 59, the subject matter of Examples 52-58, wherein the heater assembly comprises a first ring having a first inner diameter and a first outer diameter, and a second ring having a second inner diameter less than the first inner diameter and a second outer diameter substantially the same as the first outer diameter, the first ring and the second ring coupled to each other such that the first and second outer diameters are substantially aligned.

In Example 60, the subject matter of Examples 52-59, wherein the first ring and the second ring each comprise a first half and a second half, wherein the first half of the first ring is coupled to the first half of the second ring, and wherein the second half of the first ring is coupled to the second half of the second ring.

Example 61 is a method of manufacturing an electrode for an energy storage device using a roller system comprising an induction heating system and a heater assembly coupled to a roller, the method comprising: generating a magnetic field using the induction heating system; receiving the magnetic field at the heater assembly coupled to the roller; generating heat in the heater assembly in response to receiving the magnetic field; thermally expanding at least a portion of the roller using the generated heat; determining that the roller is sufficiently heated; and in response to determining that the roller is sufficiently heated, performing a roller operation to form the electrode.

In Example 62, the subject matter of Example 61, wherein the roller operation comprises depositing a thin film on the electrode, rotating the roller, and pressing the thin film against the electrode with the roller being rotated such that the thin film is formed on the electrode; and determining whether the roller is sufficiently heated comprises sensing a temperature of the heater assembly using one or more non-contact infrared sensors, and comparing the sensed temperature to a threshold temperature.

In Example 63, the subject matter of Examples 61-62, further comprising: monitoring a temperature of the heater assembly using one or more temperature sensors; controlling the induction heating system using a closed-loop Proportional-Integral-Derivative (PID) control system based on feedback from the one or more temperature sensors; and adjusting the heating based on at least one of thickness or loading density of a material layer as measured by in-line metrology equipment.

In Example 64, the subject matter of Examples 61-63, wherein the heater assembly comprises a first component made of steel and a second component made of copper; generating heat in the heater assembly comprises generating eddy currents in the first component in response to receiving the magnetic field; and thermally expanding at least a portion of the roller comprises transferring heat generated by the eddy currents from the second component to the roller.

In Example 65, the subject matter of Examples 61-64, further comprising: compensating for disproportionate heat loss from ends of the roller by maintaining a substantially uniform temperature distribution along the length of the roller; maintaining a substantially similar outer diameter throughout an axial length of the roller prior to or during the roller operation; and pressing a material layer on a substrate interposed between the roller and an opposing member proximal to the roller.

Example 66 is a method of manufacturing a kit for retrofitting a roller system to reduce thermal crowning, comprising: providing an induction heating system configured to generate a magnetic field; providing a heater assembly configured to be coupled to a roller, the heater assembly configured to receive the magnetic field from the induction heating system and, in response to receiving the magnetic field, generate heat to thermally expand at least a portion of the roller when coupled; and configuring a control unit to control the induction heating system based on feedback from one or more temperature sensors.

In Example 67, the subject matter of Example 66, wherein providing the heater assembly comprises: providing a first component made of a ferromagnetic material configured to generate eddy currents in response to receiving the magnetic field; providing a second component made of a thermally conductive material configured to transfer heat generated by the eddy currents to the roller when coupled; and coupling the first component to the second component; and providing the induction heating system comprises: constructing one or more induction heating coils configured to be disposed adjacent to one or both ends of the roller.

In Example 68, the subject matter of Examples 66-67, further comprising: configuring one or more non-contact infrared sensors to monitor a temperature of the heater assembly; programming the control unit to implement a closed-loop Proportional-Integral-Derivative (PID) control system based on at least one of thickness or loading density of a material layer as measured by in-line metrology equipment; and designing the heater assembly to compensate for disproportionate heat loss from ends of the roller when coupled, thereby maintaining a substantially uniform temperature distribution along the length of the roller.

What is claimed is:

1. A roller system for forming a material layer on a substrate, the roller system comprising:

an inductive power generator to generate a magnetic field;

an opposing member; and a roller proximal to the opposing member, wherein the roller and the opposing member are configured to press the material layer on the substrate interposed therebetween;

a heater plate located at an end of the roller and thermally coupled to the roller, the heater plate comprising a first ring to generate an eddy current and heat, and a second ring thermally coupled to the first ring to transfer the heat from the first ring to a portion of the roller, the heater plate thereby configured to:

receive the magnetic field from the inductive power generator; and in response to receiving the magnetic field, generate the eddy current and heat the portion of the roller to thermally expand a diameter of the roller.

2. The roller system of claim 1, wherein the first ring comprises a ferromagnetic material configured to generate the eddy current in response to receiving the magnetic field.

3. The roller system of claim 1, wherein the second ring comprises a thermally conductive material configured to transfer heat generated by the eddy current to the roller.

4. The roller system of claim 1, wherein the heater plate is configured to be secured to an end portion of the roller.

5. The roller system of claim 4, wherein the inductive power generator comprises one or more induction heating coils disposed adjacent to an end of the roller.

6. The roller system of claim 5, wherein the one or more induction heating coils are fixed while the roller rotates.

7. The roller system of claim 1, further comprising a control unit coupled to the inductive power generator and to operationally control the heating of the portion of the roller.

8. The roller system of claim 7, wherein the control unit is to utilize input from at least one temperature sensor that measures temperature along the roller to dynamically adjust the heating of the portion of the roller.

9. The roller system of claim 7, wherein the control unit is to control the inductive power generator using a closed-loop Proportional-Integral-Derivative (PID) control system based on at least one of thickness or loading density of the material layer as measured by in-line metrology equipment.

10. A roller system for forming a material layer on a substrate, the roller system comprising:

an inductive power generator to generate a magnetic field;

an opposing member; and a roller proximal to the opposing member, wherein the roller and the opposing member are configured to press the material layer on the substrate interposed therebetween;

a heater plate thermally coupled to the roller, wherein the heater plate comprises:

a first ring to generate an eddy current and heat; and a second ring, thermally coupled to the first ring, and to transfer the heat from the first ring to a portion of the roller.

* * * * *